US011563534B2

(12) United States Patent
Ozturk et al.

(10) Patent No.: US 11,563,534 B2
(45) Date of Patent: Jan. 24, 2023

(54) COMMUNICATION PERIODS FOR MULTI-USIM AND DUAL CONNECTIVITY OPERATION

(71) Applicant: QUALCOMM Incorporated, San Diego, CA (US)

(72) Inventors: Ozcan Ozturk, San Diego, CA (US); Gavin Bernard Horn, La Jolla, CA (US); Reza Shahidi, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 88 days.

(21) Appl. No.: 17/115,025

(22) Filed: Dec. 8, 2020

(65) Prior Publication Data

US 2021/0195670 A1 Jun. 24, 2021

Related U.S. Application Data

(60) Provisional application No. 62/951,336, filed on Dec. 20, 2019.

(51) Int. Cl.
*H04W 72/12* (2009.01)
*H04L 5/14* (2006.01)
(Continued)

(52) U.S. Cl.
CPC ............. *H04L 5/0032* (2013.01); *H04W 8/08* (2013.01); *H04W 8/183* (2013.01); *H04W 8/24* (2013.01);
(Continued)

(58) Field of Classification Search
None
See application file for complete search history.

(56) References Cited

U.S. PATENT DOCUMENTS 9,775,082 B1 9/2017 Chakraborty et al.
9,859,935 B1 1/2018 Agarwal et al.
(Continued)

FOREIGN PATENT DOCUMENTS

WO 2020191524 10/2020
WO 2020263456 12/2020

OTHER PUBLICATIONS

International Search Report and Written Opinion—PCT/US2020/064045—ISA/EPO—dated Apr. 1, 2021.

*Primary Examiner* — Gary Lafontant
(74) *Attorney, Agent, or Firm* — Patterson+ Sheridan, L.L.P.

(57) ABSTRACT

Certain aspects of the present disclosure provide techniques for multi-universal subscriber identification module (USIM) and dual connectivity operation. A method that may be performed by a user equipment (UE) includes establishing a first access link, associated with a first subscriber identification module (SIM) of the UE, for communicating with a first base station; establishing a second access link, associated with the first SIM of the UE, for communicating with a second base station; establishing a third access link associated with a second SIM of the UE; identifying at least one time division multiplexing (TDM) pattern indicating a set of time periods during which to use the third access link; and tuning to the third access link for communicating using the second SIM during at least one time period of the set of time periods indicated in the TDM pattern.

29 Claims, 9 Drawing Sheets

(51) Int. Cl.
  *H04L 5/00* (2006.01)
  *H04W 76/15* (2018.01)
  *H04W 72/04* (2009.01)
  *H04W 8/18* (2009.01)
  *H04W 76/27* (2018.01)
  *H04W 8/08* (2009.01)
  *H04W 8/24* (2009.01)
  *H04W 80/02* (2009.01)

(52) U.S. Cl.
  CPC ....... *H04W 72/042* (2013.01); *H04W 72/048* (2013.01); *H04W 72/0413* (2013.01); *H04W 72/0446* (2013.01); *H04W 76/15* (2018.02); *H04W 76/27* (2018.02); *H04W 80/02* (2013.01)

(56) References Cited

U.S. PATENT DOCUMENTS

2018/0368199 A1* 12/2018 Zeng ................ H04W 72/1215
2019/0223116 A1   7/2019 Chen et al.
2019/0380138 A1  12/2019 Zhang et al.
2021/0194651 A1   6/2021 Ozturk
2021/0266815 A1   8/2021 Wei et al.

\* cited by examiner

COMMUNICATION PERIODS FOR MULTI-USIM AND DUAL CONNECTIVITY OPERATION

CROSS-REFERENCE TO RELATED APPLICATIONS

This application claims benefit of and priority to U.S. Provisional Application No. 62/951,336, filed Dec. 20, 2019, which is hereby assigned to the assignee hereof and hereby expressly incorporated by reference herein in its entirety as if fully set forth below and for all applicable purposes.

FIELD OF THE DISCLOSURE

Aspects of the present disclosure relate to wireless communications, and more particularly, to techniques for communication periods for multi-universal subscriber identification module (USIM) and dual connectivity operation.

INTRODUCTION

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved multi-universal subscriber identification module (USIM) and dual connectivity operation.

Certain aspects provide a method, performed by a user equipment (UE), for wireless communication. The method generally includes establishing a first access link, associated with a first subscriber identification module (SIM) of the UE, for communicating with a first base station; establishing a second access link, associated with the first SIM of the UE, for communicating with a second base station; establishing a third access link associated with a second SIM of the UE; identifying at least one time division multiplexing (TDM) pattern indicating a set of time periods during which to use the third access link; and tuning to the third access link for communicating using the second SIM during at least one time period of the set of time periods indicated in the TDM pattern.

Certain aspects provide an apparatus for wireless communications by a user equipment. The apparatus generally includes at least one processor configured to establish a first access link, associated with a first subscriber identification module (SIM) of the UE, for communicating with a first base station; establish a second access link, associated with the first SIM of the UE, for communicating with a second base station; establish a third access link associated with a second SIM of the UE; identify at least one time division multiplexing (TDM) pattern indicating a set of time periods during which to use the third access link; and tune to the third access link for communicating using the second SIM during at least one time period of the set of time periods indicated in the TDM pattern. The apparatus also generally includes a memory coupled with the at least one processor.

Certain aspects provide an apparatus for wireless communications by a user equipment in a network. The apparatus generally includes means for establishing a first access link, associated with a first subscriber identification module (SIM) of the UE, for communicating with a first base station; means for establishing a second access link, associated with the first SIM of the UE, for communicating with a second base station; means for establishing a third access link associated with a second SIM of the UE; means for identifying at least one time division multiplexing (TDM) pattern indicating a set of time periods during which to use the third access link; and means for tuning to the third access link for communicating using the second SIM during at least one time period of the set of time periods indicated in the TDM pattern.

Certain aspects provide a non-transitory computer-readable medium for wireless communications by a user equipment in a network. The non-transitory computer-readable medium generally includes instructions that, when executed by at least one processor, cause the at least one processor to establish a first access link, associated with a first subscriber identification module (SIM) of the UE, for communicating with a first base station; establish a second access link, associated with the first SIM of the UE, for communicating with a second base station; establish a third access link associated with a second SIM of the UE; identify at least one time division multiplexing (TDM) pattern indicating a set of time periods during which to use the third access link; and tune to the third access link for communicating using the second SIM during at least one time period of the set of time periods indicated in the TDM pattern.

Certain aspects provide a method for wireless communications by a base station (BS). The method generally includes establishing a first access link for communicating with a user equipment; identifying at least one time division multiplexing (TDM) pattern indicating a set of time periods for the UE to use to tune to a second access link for communicating with a second base station; and one of reducing or stopping transmissions to the UE on the first access link during at least one time period of the set of time periods.

Certain aspects provide an apparatus for wireless communications by a base station (BS). The apparatus generally includes at least one processor configured to establishing a first access link for communicating with a user equipment; identify at least one time division multiplexing (TDM) pattern indicating a set of time periods for the UE to use to tune to a second access link for communicating with a second base station; and one of reduce or stop transmissions to the UE on the first access link during at least one time period of the set of time periods. The apparatus also generally includes a memory coupled with the at least one processor.

Certain aspects provide an apparatus for wireless communications by a base station (BS). The apparatus generally includes means for establishing a first access link for communicating with a user equipment; means for identifying at least one time division multiplexing (TDM) pattern indicating a set of time periods for the UE to use to tune to a second access link for communicating with a second base station; and one of means for reducing or means for stopping transmissions to the UE on the first access link during at least one time period of the set of time periods.

Certain aspects provide a non-transitory computer-readable medium for wireless communications by a base station (BS). The non-transitory computer-readable medium generally includes instructions that, when executed by at least one processor, cause the at least one processor to establishing a first access link for communicating with a user equipment; identify at least one time division multiplexing (TDM) pattern indicating a set of time periods for the UE to use to tune to a second access link for communicating with a second base station; and one of reduce or stop transmissions to the UE on the first access link during at least one time period of the set of time periods.

Certain aspects provide a method, performed by a user equipment (UE), for wireless communication. The method generally includes establishing a first access link, associated with a first subscriber identification module (SIM) of the UE, for communicating with a first base station; establishing a second access link, associated with the first SIM of the UE, for communicating with a second base station; establishing a third access link associated with a second SIM of the UE; determining a need for reduced capability on the second access link to communicate on the third access link; transmitting an indication of the need for the reduced capability to the second base station; and communicating on the third access link using the second SIM simultaneously with communicating on the second access link using the first SIM, wherein communicating on the second access link is at the reduced capability.

Certain aspects provide an apparatus for wireless communications by a user equipment. The apparatus generally includes at least one processor configured to establish a first access link, associated with a first subscriber identification module (SIM) of the UE, for communicating with a first base station; establish a second access link, associated with the first SIM of the UE, for communicating with a second base station; establish a third access link associated with a second SIM of the UE; determine a need for reduced capability on the second access link to communicate on the third access link; transmit an indication of the need for the reduced capability to the second base station; and communicate on the third access link using the second SIM simultaneously with communicating on the second access link using the first SIM, wherein communicating on the second access link is at the reduced capability. The apparatus also generally includes a memory coupled with the at least one processor.

Certain aspects provide an apparatus for wireless communications by a user equipment in a network. The apparatus generally includes means for establishing a first access link, associated with a first subscriber identification module (SIM) of the UE, for communicating with a first base station; means for establishing a second access link, associated with the first SIM of the UE, for communicating with a second base station; means for establishing a third access link associated with a second SIM of the UE; means for determining a need for reduced capability on the second access link to communicate on the third access link; means for transmitting an indication of the need for the reduced capability to the second base station; and means for communicating on the third access link using the second SIM simultaneously with communicating on the second access link using the first SIM, wherein communicating on the second access link is at the reduced capability.

Certain aspects provide a non-transitory computer-readable medium for wireless communications by a user equipment in a network. The non-transitory computer-readable medium generally includes instructions that, when executed by at least one processor, cause the at least one processor to establish a first access link, associated with a first subscriber identification module (SIM) of the UE, for communicating with a first base station; establish a second access link, associated with the first SIM of the UE, for communicating with a second base station; establish a third access link associated with a second SIM of the UE; determine a need for reduced capability on the second access link to communicate on the third access link; transmit an indication of the need for the reduced capability to the second base station; and communicate on the third access link using the second SIM simultaneously with communicating on the second access link using the first SIM, wherein communicating on the second access link is at the reduced capability.

Certain aspects provide a method for wireless communications by a base station (BS). The method generally includes establishing a first access link for communicating with a user equipment; receiving, from the UE, an indication of a need for reduced capability on the first access link; and reducing a number of transmissions to the UE on the first access link in response to the indication of the need for the reduced capability.

Certain aspects provide an apparatus for wireless communications by a base station (BS). The apparatus generally includes at least one processor configured to establishing a first access link for communicating with a user equipment; receive, from the UE, an indication of a need for reduced capability on the first access link; and reduce a number of transmissions to the UE on the first access link in response to the indication of the need for the reduced capability. The apparatus also generally includes a memory coupled with the at least one processor.

Certain aspects provide an apparatus for wireless communications by a base station (BS). The apparatus generally includes means for establishing a first access link for communicating with a user equipment; means for receiving, from the UE, an indication of a need for reduced capability on the first access link; and means for reducing a number of transmissions to the UE on the first access link in response to the indication of the need for the reduced capability.

Certain aspects provide a non-transitory computer-readable medium for wireless communications by a base station (BS). The non-transitory computer-readable medium generally includes instructions that, when executed by at least one processor, cause the at least one processor to establishing a first access link for communicating with a user equipment; receive, from the UE, an indication of a need for reduced capability on the first access link; and reduce a number of transmissions to the UE on the first access link in response to the indication of the need for the reduced capability.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Aspects of the present disclosure provide apparatus, methods, processing systems, and computer readable mediums for multi-universal subscriber identification module (USIM) and dual connectivity operation. For example, in some cases, a UE may have a first access link established with a first base station, a second access link established with a second base station, and a third access link established with a third base station. Accordingly, techniques presented herein involve tuning away from the second access link to the third access link according to a TDM pattern that indicates a set of time periods during which to use the third access link. According to aspects, these techniques may be transparent to the first base station on the first access link.

As noted, the following description provides examples of multi-USIM and dual connectivity operation, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

Figure 1:
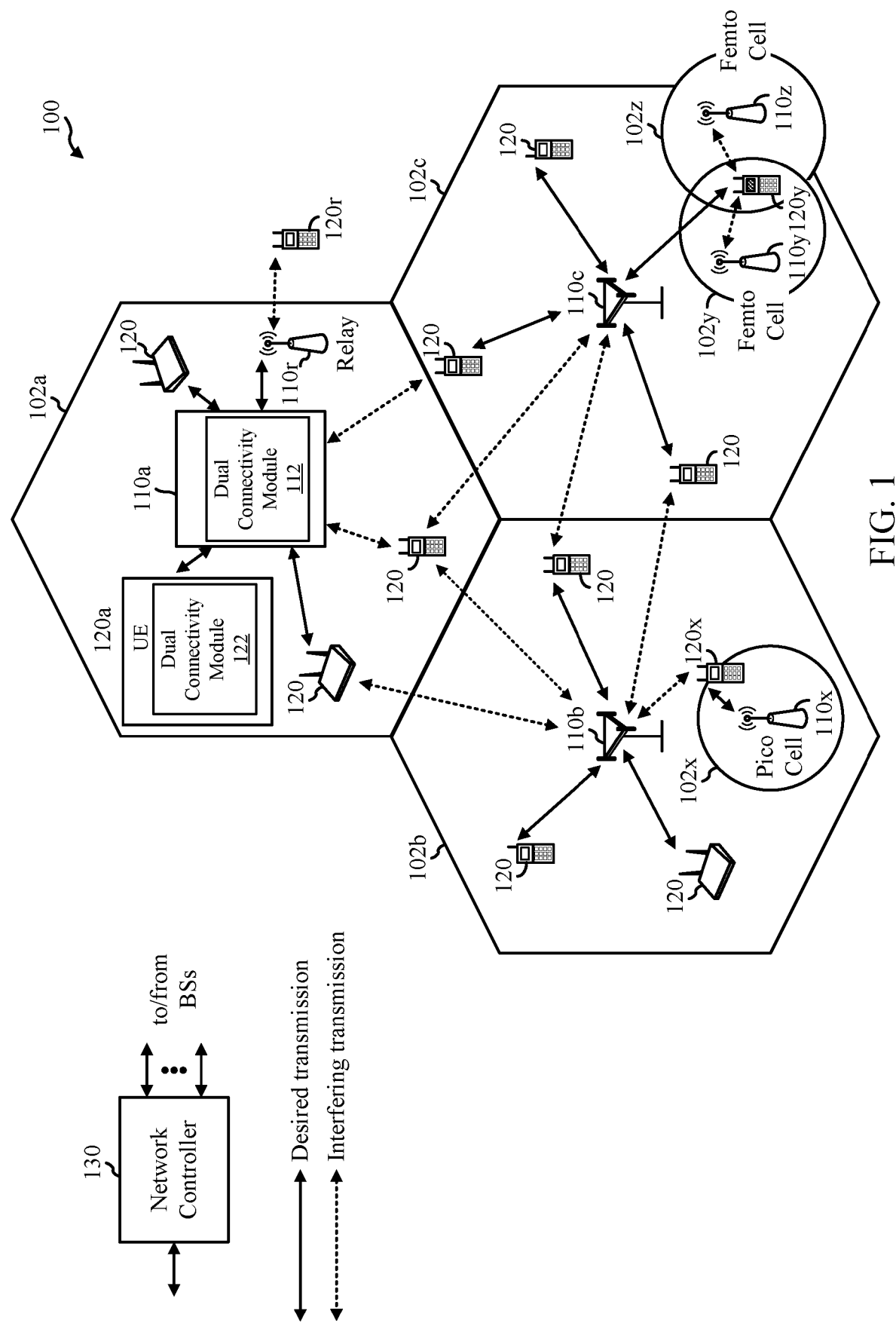
FIG. 1 is a block diagram conceptually illustrating an example telecommunications system, in accordance with certain aspects of the present disclosure.

FIG. 1 illustrates an example wireless communication network 100 in which aspects of the present disclosure may be performed. For example, the wireless communication network 100 may be an NR system (e.g., a 5G NR network).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile.

According to certain aspects, the BSs 110 and UEs 120 may be configured for multi-universal subscriber identification module (USIM) and dual connectivity operation, as described herein. As shown in FIG. 1, the BS 110a includes a dual connectivity module 112. The dual connectivity module 112 may be configured to perform the operations illustrated in one or more of FIGS. 4, 5, and 7, as well as other operations disclosed herein for multi-USIM and dual connectivity operation, in accordance with aspects of the present disclosure. Additionally, as shown in FIG. 1, the UE 120a includes a dual connectivity module 122. The dual connectivity module 122 may be configured to perform the operations illustrated in one or more of FIGS. 3, 5, and 6, as well as other operations disclosed herein for multi-USIM and dual connectivity operation, in accordance with aspects of the present disclosure.

Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (e.g., directly or indirectly) via wireless or wireline backhaul.

Figure 2:
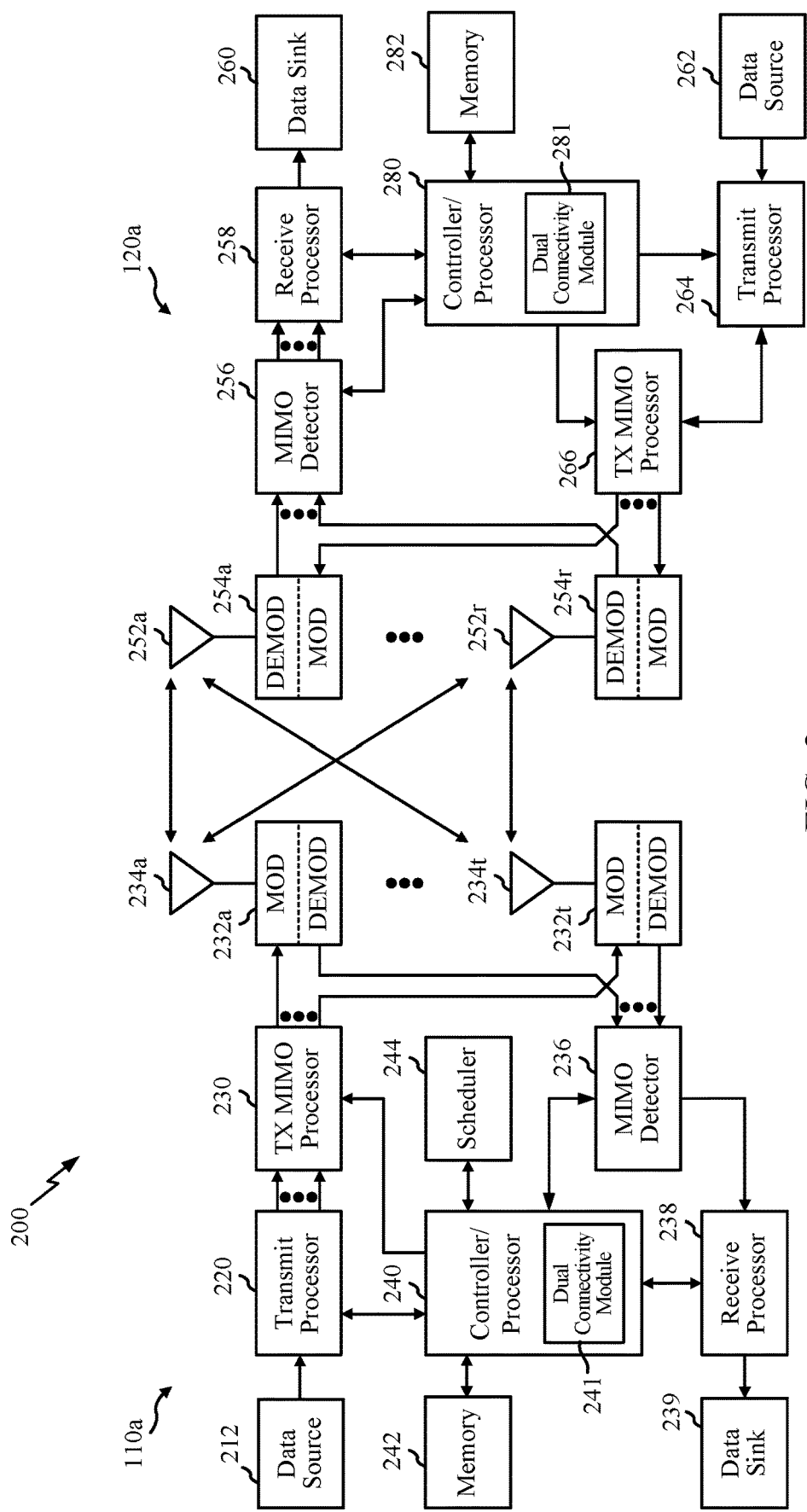
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from the modulators in transceivers 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator in transceivers 254a-254r may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the demodulators in transceivers 254a-254r (e.g., for SC-FDM, etc.), and transmitted to the BS 110a. At the BS 110a, the uplink signals from the UE 120a may be received by the antennas 234, processed by the modulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

The controller/processor 280 and/or other processors and modules at the BS 110 and/or UE 120a may perform or direct the execution of processes for the techniques described herein. For example, as shown in FIG. 2, the controller/processor 240 of the BS 110a includes a dual connectivity module 241 that may be configured to perform the operations illustrated in one or more of FIGS. 4, 5, and 7, as well as other operations disclosed herein for multi-USIM and dual connectivity operation, according to aspects described herein. As shown in FIG. 2, the controller/processor 280 of the UE 120a includes dual connectivity module 281 that may be configured to perform the operations illustrated in one or more of FIGS. 3, 5, and 6, as well as other operations disclosed herein for multi-USIM and dual connectivity operation, according to aspects described herein. Although shown at the Controller/Processor, other components of the UE 120*a* and BS 110*a* may be used performing the operations described herein.

Example Communication Periods for Multi-USIM and Dual Connectivity Operation

In certain cases, two different subscriptions may be supported on a same device, such as a user equipment (UE), and may be based on two separate subscriber identification module (SIMs), known as multi-SIM (MSIM). These subscriptions may be on the same radio network or different radio networks and could have different subscription profiles and quality of service (QOS) requirements. Further, different subscriptions may provide services on the same or different radio access technologies (RATs). Generally, MSIM solutions use less resources, while performing operations on two different RATs, than that needed by two independent solutions with the goal of optimizing resource (RF, MIPs, etc.) usage as well as providing an enhanced user experience.

In some cases, different classes of radio frequency (RF) solutions exist for MSIM devices. For example, in some cases, the MSIM device may include a dual transceiver that may provide dual receive and dual access (DSDA). For example, in this case, each subscription of the MSIM device may correspond to its own transceiver. In other cases, the MSIM device may include a single transceiver where two subscriptions share the same radio resources/receive chain. Due to RF complexity, cost, and power consumption considerations, the majority of legacy dual subscription devices and solutions share a single transceiver and the same receive chain.

With 5G New Radio (NR) deployments aggressively moving ahead globally, MSIM solutions now comprise of a combination of 5G+4G/3G/2G RATs. There are two 5G solutions defined by Rel15 3GPP standards: non-standalone (NSA) and standalone 5G (SA). In the standalone 5G NR architecture, both signaling network and radio may be handled by a 5G core network. In contrast, in 5G NSA networks, a long term evolution (LTE) core network and LTE radio access may be used as an anchor for all signaling and mobility management while adding a new 5G carrier. The NSA architecture is attractive for early deployments of 5G NR access systems as networks may reuse the legacy operational LTE eNodeB (eNB) and evolved packet core (EPC). Non-standalone solutions are also attractive as they facilitate a seamless migration from 4G to 5G for networks leveraging existing LTE core network.

Dual Connectivity (DC) has been introduced to allow a UE to simultaneously connect to two different network points for achieving higher throughput, reliability and mobility robustness. Evolved Universal Mobile Telecommunications Service Terrestrial Radio Access Network (EU-TRAN)-NR Dual Connectivity (ENDC) is one form of dual connectivity using LTE and NR. In ENDC mode and for a non-standalone implementation, the UE may be connected to an LTE eNB on a first access link and to an NR gNB on a second access link. In certain cases, the LTE eNB may act as a master node (MeNB) while the gNB may act as a secondary node (SgNB). Both nodes may interface with the Evolved packet core (EPC) in the user plane but the master node may have direct connection to EPC.

As noted, in some cases, the UE may communicate on a plurality of access links. For example, in some cases, the UE may communicate on a first access link with a first base station (e.g., an LTE base station) and may communicate on a second access link with a second base station (e.g., a 5G base station). In some cases, the first access link and the second access link may be associated with a first SIM. Additionally, in some cases, the UE may communicate on a third access link associated with a second SIM.

However, in some cases, the UE may not be capable of receiving data and/or signaling simultaneously on the plurality of access links using both SIMs. For example, in dual connectivity (e.g., EN-DC), a processing capability of the UE (e.g., due to the single receive chain) may prevent the UE from receiving using a first SIM on a first access link while concurrently receiving using the first SIM on the second access link or the second SIM on the third access link. Similarly, receive and/or transmitting, concurrently, on a plurality of access links and using a plurality of SIMs may result in interference.

Accordingly, to address these issues, aspects of the present disclosure provide techniques for enabling configuration of one or more time division multiplexing (TDM) patterns indicating a set of time periods during which to use one or more of a plurality of access links. For example, the UE may identify a TDM pattern for tuning from a second access link associated with a first SIM and to a third access link associated with a second SIM, and may tune to the third access link to, for example, receive signaling and/or data on the third access link. In some cases, the techniques presented herein may be transparent to the first base station associated with the first access link (e.g., LTE) so as not to disrupt its operation. Further, by introducing a TDM pattern for communicating on the third access link, the UE may reduce a likelihood of dropped communications resulting from attempting to concurrently transmit and/or receive a plurality of data transmissions or control signals on a plurality of access links using a plurality of SIMs.

Figure 3:
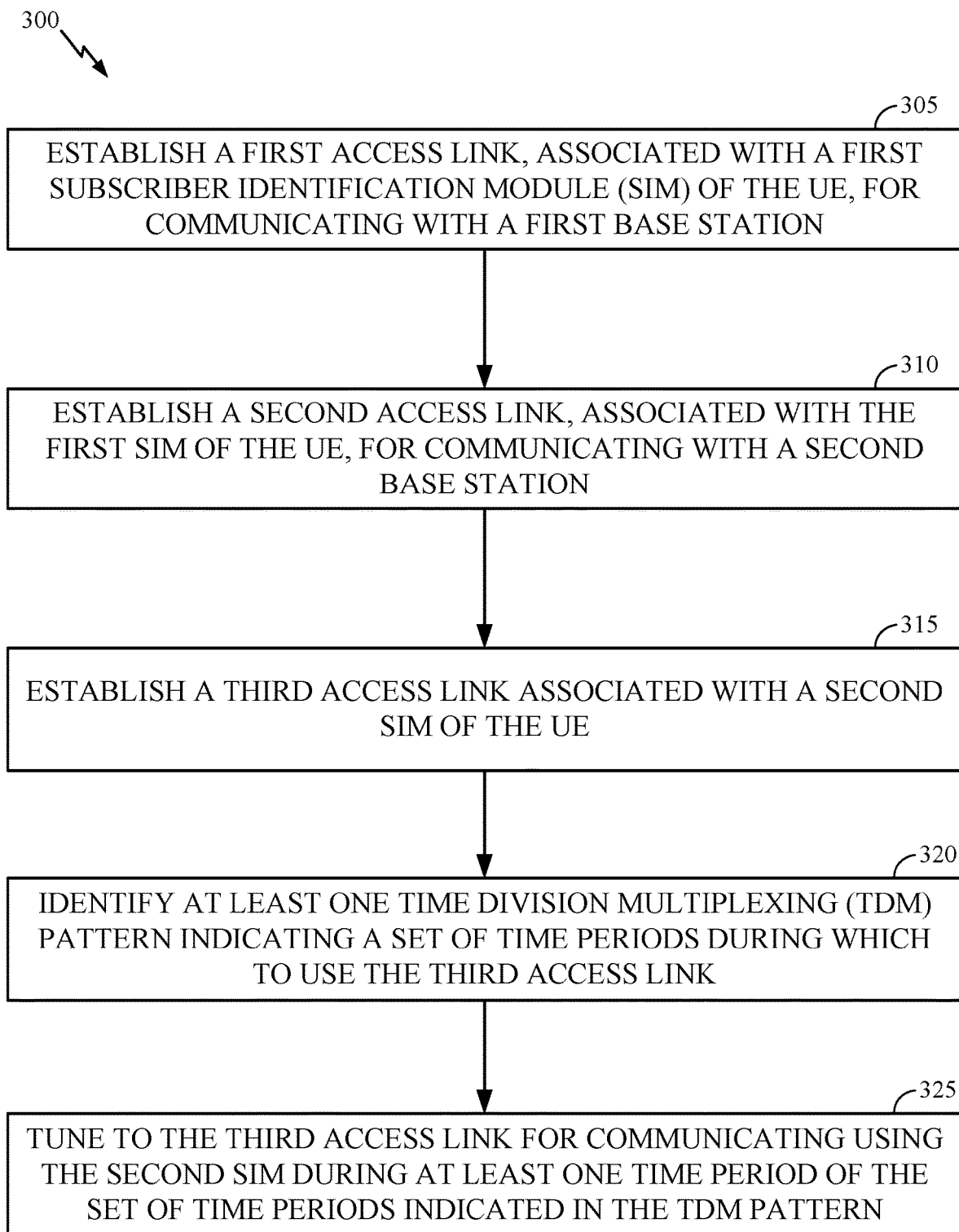
FIG. 3 is a flow diagram illustrating example operations for wireless communication by a user equipment (UE), in accordance with certain aspects of the present disclosure.

FIG. 3 is a flow diagram illustrating example operations 300 for wireless communication, in accordance with certain aspects of the present disclosure. The operations 300 may be performed, for example, by UE (e.g., such as a UE 120*a* in the wireless communication network 100) for multi-universal subscriber identification module (USIM) and dual connectivity operation, as described herein. More specifically, operations 300 may be performed by the UE for communicating with a BS according to a TDM pattern, as described herein.

Operations 300 may be implemented as software components that are executed and run on one or more processors (e.g., controller/processor 280 of FIG. 2). Further, the transmission and reception of signals by the UE in operations 300 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 300 begin, at 305, by establishing a first access link, associated with a first subscriber identification module (SIM) of the UE, for communicating with a first base station.

At 310, the UE establishes a second access link, associated with the first SIM of the UE, for communicating with a second base station.

At 315, the UE establishes a third access link associated with a second SIM of the UE.

At 320, the UE identifies at least one time division multiplexing (TDM) pattern indicating a set of time periods during which to use the third access link.

At 325, the UE tunes to the third access link for communicating using the second SIM during at least one time period of the set of time periods indicated in the TDM pattern.

Figure 4:
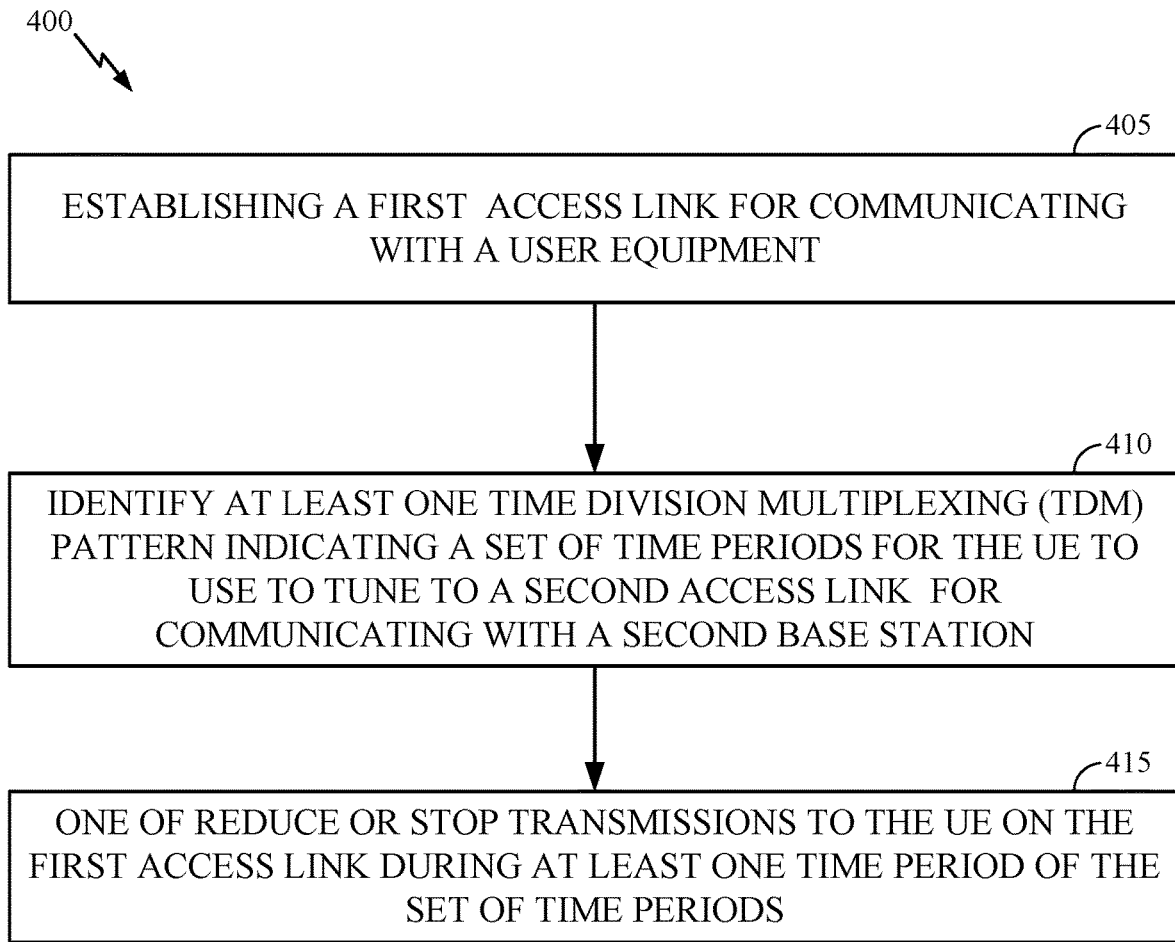
FIG. 4 is a flow diagram illustrating example operations for wireless communication by a base station (BS), in accordance with certain aspects of the present disclosure.

FIG. 4 is a flow diagram illustrating example operations 400 for wireless communication, in accordance with certain aspects of the present disclosure. The operations 400 may be performed, for example, by base station (e.g., such as a BS 110 in the wireless communication network 100) for multi-USIM and dual connectivity operation, as described herein. More specifically, operations 400 may be performed by the BS for communicating with a UE according to a TDM pattern, as described herein.

In some cases, the base station may comprise the second base station of operations 300. Operations 400 may be implemented as software components that are executed and run on one or more processors (e.g., controller/processor 240 of FIG. 2). Further, the transmission and reception of signals by the BS in operations 400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 400 begin, at 405, by establishing a first access link for communicating with a user equipment. In some cases, the first access link may correspond to the second access link established between the UE and second base station in operations 300.

At 410, the BS identifies at least one time division multiplexing (TDM) pattern indicating a set of time periods for the UE to use to tune to a second access link for communicating with a second base station. In some cases, the second access link may correspond to the third access link established by the UE in operations 300.

At 415, the BS one of reduces or stops transmissions to the UE on the first access link during at least one time period of the set of time periods.

As noted above, aspects of the present disclosure provide techniques for enabling configuration of one or more time division multiplexing (TDM) patterns indicating a set of time periods during which a UE may use one or more of a plurality of access links. For example, in some cases, a UE may establish a first access link with a first base station and a second access link with a second base station. In some cases, the UE may use a first SIM for communicating on the first access link and the second access link. In some cases, however, the UE may also establish a third access link, associated with a second SIM of the UE, for communicating with a third base station. In some cases the third base station may comprise one of the first base station, the second base station, or a completely different base station. Additionally, in some cases, the first base station may comprise a master node (e.g., LTE) and the second base station may comprise a secondary node (e.g., 5G).

Accordingly, when operating in dual connectivity mode, the UE may communicate with the first base station on the first access link and the second base station on the second access link. Additionally, in certain cases, the UE may also desire to communicate with the third base station on the third access link. However, when the UE is not capable of using both the second access link and the third access link simultaneously (e.g., due to only one transceiver and one Rx chain), a "gap" may be created on at least one of the links (e.g., the second access link) during which the UE can access the other link (e.g., the third access link). Accordingly, a TDM pattern may be identified and used by the UE for communicating on the third access link using a second SIM. For example, the TDM pattern may indicate a set of time periods during which to communicate on the third access link using the second SIM. The set of time periods indicated in the TDM pattern may correspond to periods of time when the second base station reduces or stops transmission on the second access link, allowing the UE to tune to the third access link to receive signaling and/or data.

In some cases, when the UE is capable of using both the second access link and the third access link simultaneously (e.g., the UE has at least two Rx chains) but with reduced capability, the UE may inform at least one of the second base station or third base station for such reduction (e.g., to transmit less on a respective access link). According to aspects, the reduced UE capability may also be applicable to the TDM pattern if the UE cannot fully use its capability due to frequent switching.

According to aspects, in either case, the TDM pattern may be negotiated between the UE and the second base station and may be transparent to the first base station, for example, so as to not disrupt operation of the first base station.

Figure 5:
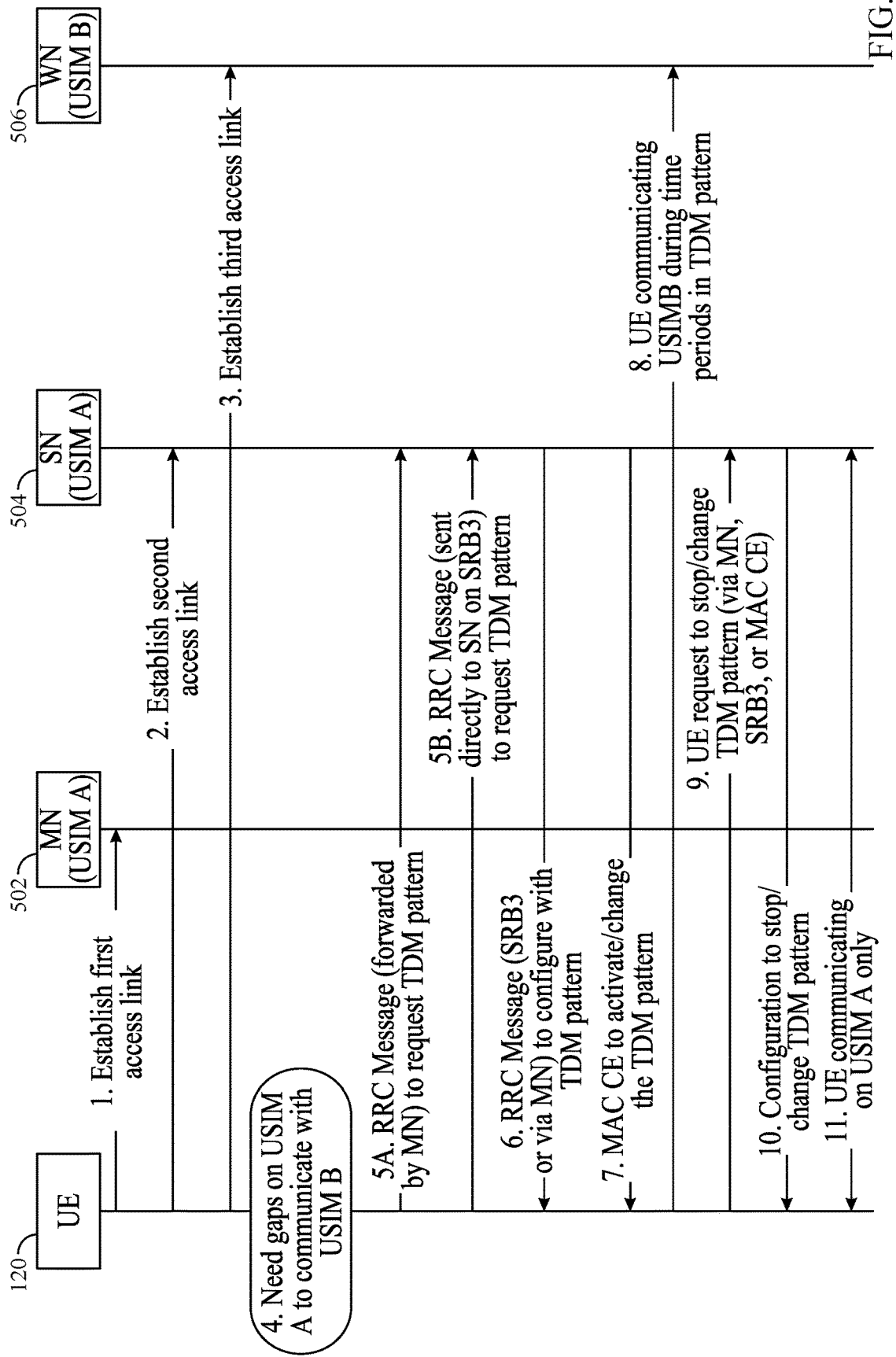
FIG. 5 illustrates an example call-flow for configuring and communicating using a TDM patter, in accordance with certain aspects of the present disclosure.

FIG. 5 illustrates an example call-flow for configuring and communicating using a TDM pattern, according to certain aspects presented herein. It should be understood that the order of steps shown in FIG. 5 is merely exemplary and that the steps may not necessarily occur in the exact order as shown. For example, in some cases, steps 1-3, described below, may occur in an order different from that shown in FIG. 5.

As illustrated in FIG. 5, at step 1, the UE 120 establishes a first access link, associated with a first SIM of the UE 120, for communicating with a first base station 502. In some cases, the first base station 502 may comprise a master node (MN) and may be associated with a first radio access technology (RAT), such as an LTE. At step 2, the UE 120 establishes a second access link, associated with the first SIM of the UE 120, for communicating with a second base station 504. In some cases, the second base station 504 may comprise a secondary node (SN) and may be associated with a second RAT, such as a 5G.

In some cases, the UE 120 may be capable of communicating on both the first access link and the second access link, known as dual connectivity. Additionally, in some cases, the UE 120 may include a second SIM and may establish a third access link associated with the second SIM of the UE 120, as shown at step 3 in FIG. 5. In some cases, the UE 120 may use the third access link for communicating with a third base station 506 (or wireless node (WN)), which may be associated with a third RAT. In some cases, the UE 120 may establish the third access link with a same base station as the first access link or the second access link but using a second SIM.

At step 4 in FIG. 5, the UE 120 determines a need for gaps on the first SIM (e.g., USIM A) to communicate on the third access link using the second SIM (e.g., USIM B). Accordingly, in response to the determination of the need for the gaps on the first SIM to communicate on the third access link using the second SIM, the UE 120 may identify at least one time division multiplexing (TDM) pattern indicating a set of time periods during which to communicate on the third access link using the second SIM. In some cases, the at least one TDM pattern may apply to downlink transmissions only, uplink transmissions only, or both uplink and downlink transmissions.

In some cases, identifying the at least one TDM pattern may include requesting a TDM pattern from the second base station 504. For example, as shown at step 5A in FIG. 5, the UE 120 may transmit signaling to the second base station 504 requesting a TDM pattern. In some cases, requesting the TDM pattern may comprise transmitting an indication to the second base station 504 indicating a need for reduced capability on the second access link. For example, in some cases, the indication of the need for the reduced capability on the second access link may request the second base station 504 to reduce transmission on the second access link during transmissions on the third access link. In such cases, the second access link may operate according to the reduced capability during at least one time period of the set of time periods indicated in the TDM pattern. That is, the second base station 504 may reduce transmissions on the second access link during the at least one time period of the set of time periods indicated in the TDM patter to facilitate communication by the UE 120 on the third access link.

Additionally, in some cases, as illustrated at step 5A in FIG. 5, transmitting the signaling to the second base station 504 requesting a TDM pattern may include transmitting the signaling to the first base station 502 in a transparent container that may be forwarded by the first base station 502 to the second base station 504. In other cases, for example, transmitting the signaling requesting the TDM pattern to the second base station 504 may comprise transmitting the signaling requesting the TDM pattern directly to the second base station 504 using a radio bearer established directly between the UE 120 and the second base station 504 (e.g., SRB3), as illustrated at step 5B in FIG. 5. In some cases, as shown in steps 5A and 5B, the signaling requesting a TDM pattern may comprise radio resource control (RRC) signaling. That is, the UE 120 may transmit the signaling requesting a TDM pattern in an RRC message.

In either case, as shown at step 6 FIG. 5, the UE 120 may receive an indication of the at least one TDM pattern from the second base station 504 configuring the UE 120 to use the TDM pattern. Accordingly, in some cases, identifying the at least one TDM pattern may include identifying the at least one TDM pattern based on the indication of the at least one TDM pattern from the second base station 504. Accordingly, the indication of the at least one TDM pattern from the second base station 504 may be transmitted in RRC signaling directly to the UE 120 (e.g., using the SRB3 bearer) or indirectly to the UE 120 (e.g., via the first base station 502 in a transparent container).

In some cases, the indication of the at least one TDM pattern from the second base station 504 may comprise an index value associated with the at least one TDM pattern and identifying the at least one TDM pattern by the UE 120 is based on the index value. For example, in some cases, the UE 120 may be configured with a plurality of TDM patterns, each associated with a different index value. The UE 120 may use the index value received from the second base station 504 to determine the TDM pattern corresponding to the received index value.

In some cases, identifying the at least one TDM pattern may include determining the TDM pattern at the UE 120 and transmitting an indication of the at least one TDM pattern to the second base station 504. That is, the signaling requesting the TDM pattern transmitted at step 5A and/or 5B of FIG. 5 may include the indication of the at least one TDM pattern determined by the UE 120. In some cases, the indication of the at least one TDM pattern determined by the UE 120 may include an index value associated with the at least one TDM pattern. The index value may be used by the second base station 504 to determine the at least one TDM pattern. For example, as noted above, in some cases, a plurality of TDM patterns may be configured, each associated with a different index value. The second base station 504 may use the index value received from the second base station 504 to determine the TDM pattern corresponding to the received index value. In some cases, the UE 120 may transmit the indication of the at least one TDM pattern to the second base station 504 in RRC signaling directly to the UE 120 (e.g., using the SRB3 bearer) or indirectly to the UE 120 (e.g., via the first base station 502 in a transparent container).

According to aspects, in the case that the UE 120 determines and transmits the indication of the at least one TDM pattern to the second base station 504 at step 5A and/or step 5B in FIG. 5, the UE 120 may receive a confirmation from the second base station 504 confirming the at least one TDM pattern. That is, as shown at step 6 in FIG. 5 upon receiving the indication of the at least one TDM pattern from the UE 120, the second base station 504 may transmit a confirmation message to the UE 120, confirming and configuring the UE 120 with the at least one TDM pattern. At noted above, the confirmation message may be received by the UE 120 directly from the second base station 504 (e.g., using the SRB3 bearer) or indirectly from the first base station 502 (e.g., in a transparent container). In some cases, the confirmation message may indicate an index value associated with the at least one TDM pattern.

According to aspects, at step 7 of FIG. 5, the UE 120 may receive signaling from the second base station 504 activating the at least one TDM pattern. According to aspects, in some cases, the signaling from the second base station 504 activating the at least one TDM pattern may indicate to the UE 120 to start using the at least one TDM pattern when communicating on the second access link and third access link. In some cases, the signaling activating the at least one TDM pattern (e.g., indicating to the UE 120 to start using the at least one TDM pattern) may be received in at least one of media access control (MAC) layer signaling or physical (PHY) layer signaling. In some cases, the MAC signaling comprises a MAC control element (MAC-CE) and the PHY layer signaling comprises downlink control information (DCI). In some cases, the MAC layer signaling or the PHY layer signaling may include an index value associated with the at least one TDM pattern. Additionally, in some cases, the UE 120 may start using the at least one TDM pattern immediately after receiving the signaling indicating to start/activate the at least one TDM pattern. In other cases, the UE 120 may start using the at least one TDM pattern immediately after the UE 120 processes the RRC signaling at step 6 in FIG. 5 configuring/confirming the UE 120 with the at least one TDM pattern.

According to aspects, in some cases, the signaling from the second base station 504 received at step 7 in FIG. 5 may include an indication to change the at least one TDM pattern (e.g., already configured in the UE). For example, in this case, the indication to change the at least one TDM pattern may include an indication of a new TDM pattern to use.

According to aspects, at step 8 of FIG. 5, the UE 120 may tune to the third access link and communicate on the third access link with the third base station 506 using the second SIM (e.g., USIM B), for example, during at least one time period of the set of time periods indicated in the TDM pattern. For example, in some cases, during at least one time period of the set of time periods indicated in the TDM pattern the UE 120 may transmit or receive signaling and/or data on the third access link. According to aspects, while the UE 120 is communicating on the third access link during at least one time period of the set of time periods indicated in the TDM pattern, the second base station 504 may reduce or stop transmissions to the UE 120 on the second access link. In some cases, during the set of time periods indicated in the TDM pattern the UE 120 may use the first access link for uplink transmissions to the first base station 502. Thereafter, outside of the set of time periods indicated in the TDM pattern, the UE 120 may autonomously switch to normal operation, such as receiving downlink transmission or transmitting uplink transmissions to the first base station on the first access link.

In some cases, the UE 120 may transmit uplink signaling and data on only the first access link during the at least one time period of the set of time periods indicated in the TDM pattern. According to aspects, this may be the case when for when the UE 120 is not able to use both links for an uplink split bearer during the at least one time period of the set of time periods indicated in the TDM pattern. In some cases, this may require a specification change to allow this "autonomous" UE 120 behavior as the first base station may not be aware of the at least one TDM pattern.

According to aspects, as noted above, the third base station 506 may comprise the first base station 502, the second base station 504, or a WN/base station different from the first base station 502 and the second base station 504. Accordingly, in some cases, tuning to the third access link for communicating using the second SIM during the at least one time period of the set of time periods indicated in the at least one TDM pattern may comprise one of: communicating with the first base station 502 on the third access link using the second SIM, communicating with the second base station 504 on the third access link using the second SIM, or communicating with a third base station 506 on the third access link using the second SIM that is different from the first base station 502 and the second base station 504.

At step 9 of FIG. 5, the UE 120 may transmit a request to the second base station 504 to stop using the at least one TDM pattern based on one or more criteria. For example, in some cases, in some cases, the one or more criteria may comprise the commencement of a voice call at the UE 120. In some cases, the request to stop the at least one TDM pattern may be transmitted directly to the second bases station (e.g., using the SRB3 bearer) or indirectly to the second base station 504 (e.g., via the first base station 502 in a transparent container). In some cases, the UE 120 may transmit the request to stop the at least one TDM pattern in a MAC-CE.

In some cases, the request transmitted at step 9 of FIG. 5 may comprise a request to change the at least one TDM pattern. In this case, transmitting the request to change the at least one TDM pattern by the UE 120 may comprise transmitting an explicit indication to request the change in the at least one TDM pattern in radio resource control (RRC) signaling. Additionally, in other cases, transmitting the request to change the at least one TDM pattern by the UE 120 comprises transmitting an implicit indication to request the change in the at least one TDM pattern in media access control (MAC) signaling. In some cases, the implicit indication may include an index value associated with the at least one TDM pattern.

At step 10 of FIG. 5, the UE 120 may receive an indication from the second base station 504 to stop using the at least one TDM pattern. In some cases, the indication from the second base station 504 may comprise a confirmation in response to the request to stop using the at least one TDM pattern transmitted by the UE 120 in step 9 of FIG. 5. In other cases, the indication from the second base station 504 to stop using the at least one TDM pattern may be transmitted by the second base station 504 autonomously, for example, without a request from the UE 120. In some cases, indication from the second base station 504 to stop using the at least one TDM pattern may be based on the one or more criteria, such as the second base station 504 detecting a commencement of a voice call at the UE 120. According to aspects, in some cases, the indication to stop using the at least one TDM pattern may be received from the second base station 504 in at least one of in media access control (MAC) layer signaling or physical (PHY) layer signaling and may comprises an index value associated with the at least one TDM pattern. In some cases, the indication from the second base station 504 to stop using the at least one TDM pattern may be received from the first base station 502 in a transparent container (e.g., forwarded from the second base station 504) or may be received directly from the second base station 504 (e.g., via SRB3).

At step 11 of FIG. 5, after receiving the indication to stop using the at least one TDM pattern, the UE 120 may return to communicating only using the first SIM and may cease communicating on the third access link with the third base station 506 (e.g., using the second SIM).

In some cases, the at least one TDM pattern may be periodic, aperiodic, or semi-persistent. For example, when the at least one TDM pattern is periodic, the UE 120 may receiving paging or system information on the third access link periodically during the set of time periods indicated in the at least one TDM pattern. In other words, the set of time periods indicated in the at least one TDM pattern may occur periodically. Additionally, in some cases, when the at least one TDM pattern is periodic, the UE 120 may transmit a tracking area update (TAU) or a radio access network notification area update (RNAU) periodically during the set of time periods indicated in the at least one TDM pattern.

According to certain aspects, when the at least one TDM pattern is aperiodic, the UE 120 may only be configured to communicate during the set of time periods indicated in the at least one TDM pattern once and may not repeat the at least one TDM pattern after the at least one TDM pattern is complete. According to aspects, when the at least one TDM pattern is aperiodic, the UE 120 may transmit at least one of a tracking area update (TAU) or a radio access network notification area update (RNAU) during the set of time periods indicated in the at least one TDM pattern due to a mobility decision at the UE 120 (e.g., handover and the like).

According to certain aspects, when the at least one TDM pattern is semi-persistently configured, the UE 120 may be configured with an indication of when and for how long to use the at least one TDM pattern for communicating on the third access link with the third base station 506 using the second SIM.

In some cases, a change in the second base station 504 may occur in which the UE 120 may be handed over (or may autonomously select) a different second base station 504 for communication on the second link using the first SIM. In such a case, if a TDM pattern is configured at the second base station 504 and UE 120, the TDM pattern may be released or maintained during the change of second base stations 504. For example, when the UE 120 changes second base stations 504, in some cases, the old second base station may inform the new second base station of the TDM pattern configured at the UE 120. In some cases, the old second base station may transmit an indication of the TDM pattern to the new second base station via the first base station 502 in a transparent container of an RRC message (e.g., the first base station 502 forwards the indication of the TDM pattern to the new second base station). According to aspects, upon receiving the indication of the TDM pattern, the new second base station may decide to release, change, or maintain the TDM pattern with the UE 120.

As noted above, in some cases, when the UE 120 is capable of communicating simultaneously on the second access link using the first SIM and the third access link using the second SIM, the UE 120 may determine a need for a reduced capability on the second access link. In some cases, the determination may be based on a capability of the UE 120 to support communication on the second access link and the third access link simultaneously. Thereafter, the UE 120 may transmit an indication of the need for the reduced capability on the second access link to the second base station 504. For example, the indication of the need for the reduced capability on the second access link may indicate to the second base station 504 to reduce an amount of transmissions by the second base station 504 to the UE 120 on the second access link. By reducing the amount of transmission by the second base station 504 to the UE 120 on the second access link, the UE 120 may have enough resources to simultaneously receive transmissions on the third access link (e.g., using the second SIM). Accordingly, after transmitting the indication of the need for the reduced capability on the second access link, the UE 120 may communicate on the third access link using the second SIM simultaneously with communicating on the second access link using the first SIM. As noted, communicating on the second access link may be performed according to, or at, the reduced capability.

In some cases, transmitting the indication of the need for the reduced capability to the second base station 504 may include transmitting the indication directly to the second base station 504. For example, in some cases, the UE 120 may transmit the indication using a signaling radio bearer established directly between the UE 120 and the second base station 504. In some cases, the signaling bearer may comprise a SRB3 bearer.

In other cases, transmitting the indication of the need for the reduced capability to the second base station 504 may comprise transmitting the indication indirectly to the second base station 504 via the first base station 502. For example, in this case, the UE 120 may transmit the indication to the first base station 502 in a transparent container to be forwarded to the second base station 504.

Figure 6:
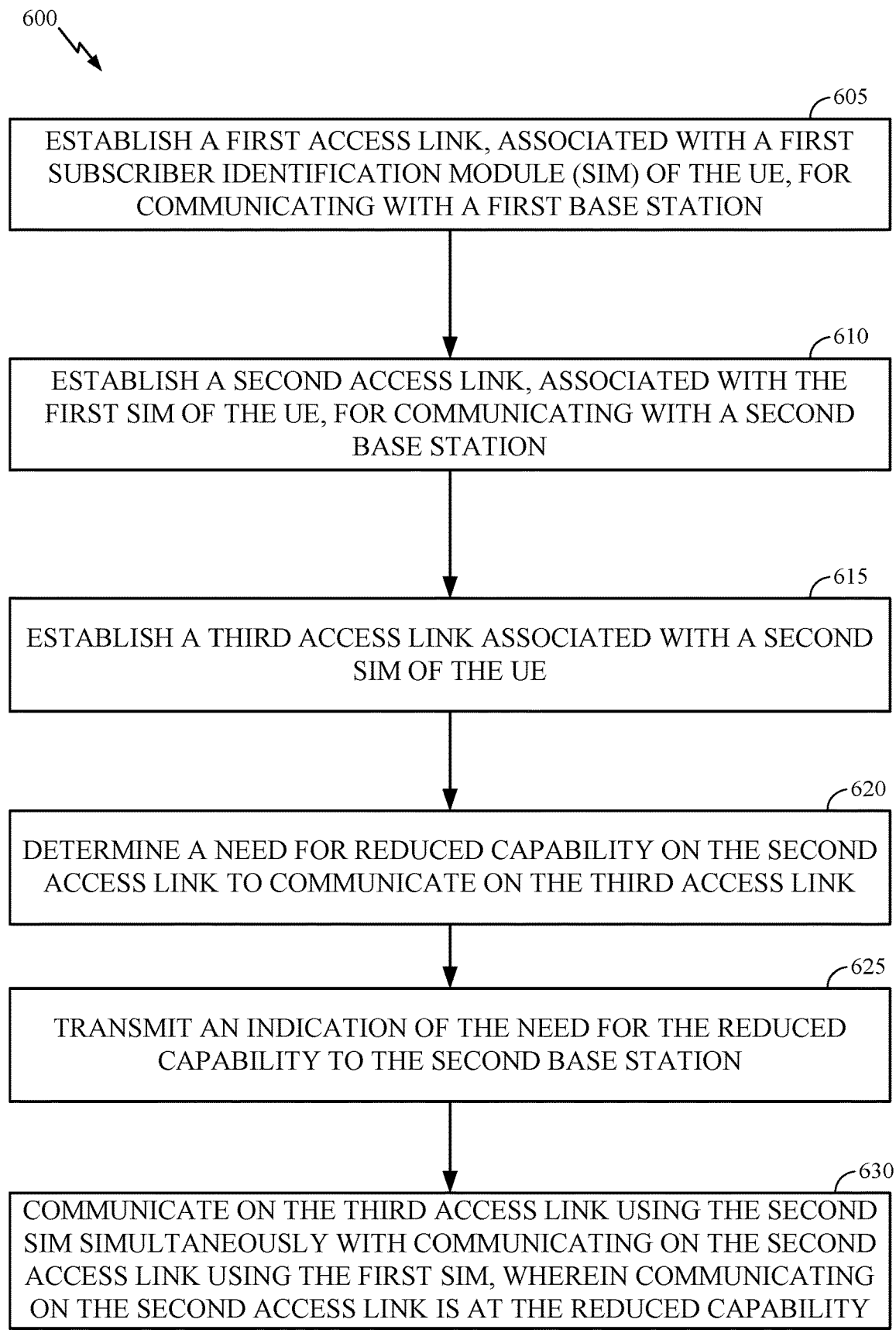
FIG. 6 is a flow diagram illustrating example operations for wireless communication by a user equipment (UE), in accordance with certain aspects of the present disclosure.

FIG. 6 is a flow diagram illustrating example operations 600 for wireless communication, in accordance with certain aspects of the present disclosure. The operations 600 may be performed, for example, by UE (e.g., such as a UE 120a in the wireless communication network 100) for multi-universal subscriber identification module (USIM) and dual connectivity operation, as described herein. More specifically, operations 600 may be performed by the UE for communicating with a BS at a reduced capability, as described herein.

Operations 600 may be implemented as software components that are executed and run on one or more processors (e.g., controller/processor 280 of FIG. 2). Further, the transmission and reception of signals by the UE in operations 300 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 begin, at 605, by establishing a first access link, associated with a first subscriber identification module (SIM) of the UE, for communicating with a first base station.

At 610, the UE establishes a second access link, associated with the first SIM of the UE, for communicating with a second base station.

At 615, the UE establishes a third access link associated with a second SIM of the UE.

At 620, the UE determines a need for reduced capability on the second access link to communicate on the third access link.

At 625, the UE transmits an indication of the need for the reduced capability to the second base station.

At 630, the UE communicates on the third access link using the second SIM simultaneously with communicating on the second access link using the first SIM, wherein communicating on the second access link is at the reduced capability.

Figure 7:
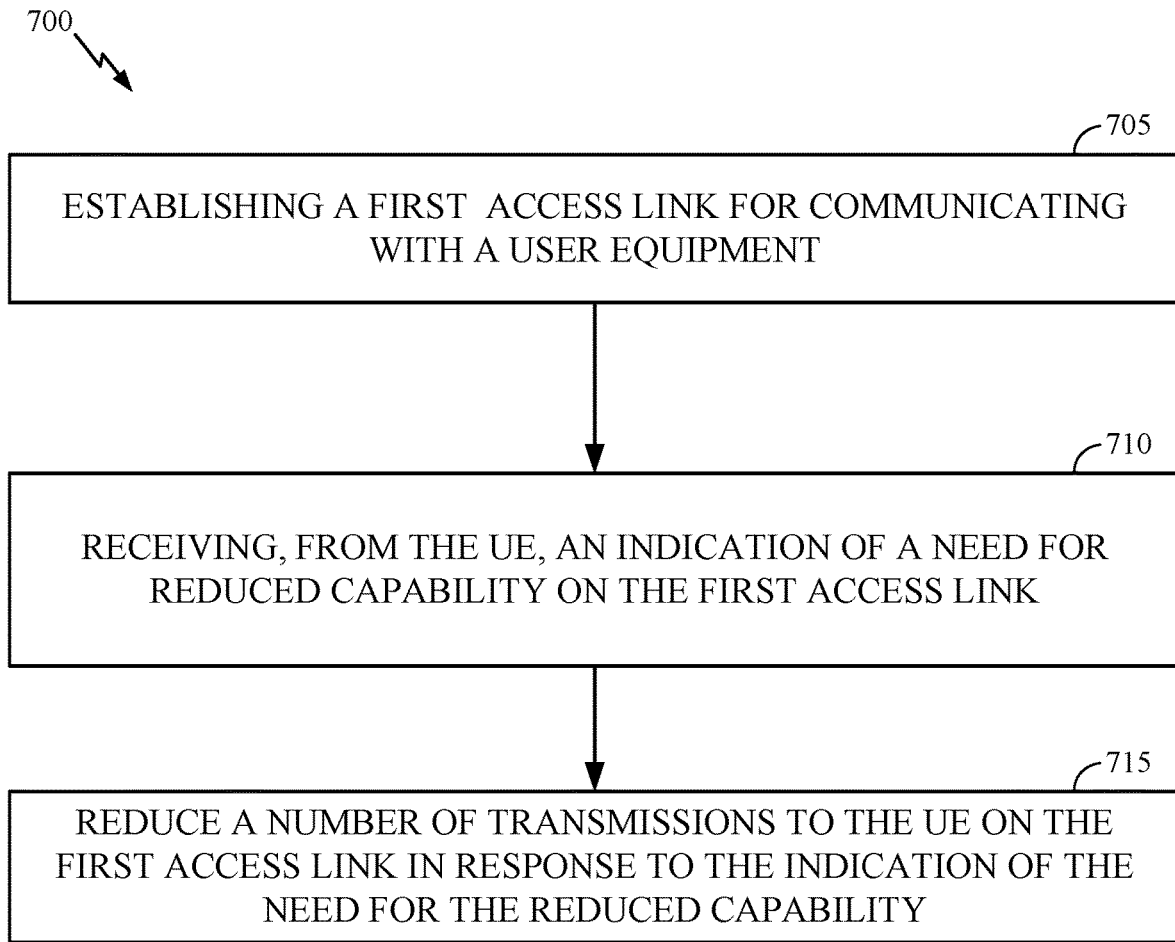
FIG. 7 is a flow diagram illustrating example operations for wireless communication by a base station (BS), in accordance with certain aspects of the present disclosure.

FIG. 7 is a flow diagram illustrating example operations 700 for wireless communication, in accordance with certain aspects of the present disclosure. The operations 700 may be performed, for example, by base station (e.g., such as a BS 110 in the wireless communication network 100) for multi-USIM and dual connectivity operation, as described herein. More specifically, operations 700 may be performed by the BS for communicating with a UE at a reduced capability, as described herein.

In some cases, the base station may comprise the second base station of operations 700. Operations 700 may be implemented as software components that are executed and run on one or more processors (e.g., controller/processor 240 of FIG. 2). Further, the transmission and reception of signals by the BS in operations 400 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 700 begin, at 705, by establishing a first access link for communicating with a user equipment. In some cases, the first access link may correspond to the second access link established between the UE and second base station in operations 300.

At 710, the BS receives, from the UE, an indication of a need for reduced capability on the first access link.

At 715, the BS reduces a number of transmissions to the UE on the first access link in response to the indication of the need for the reduced capability.

Figure 8:
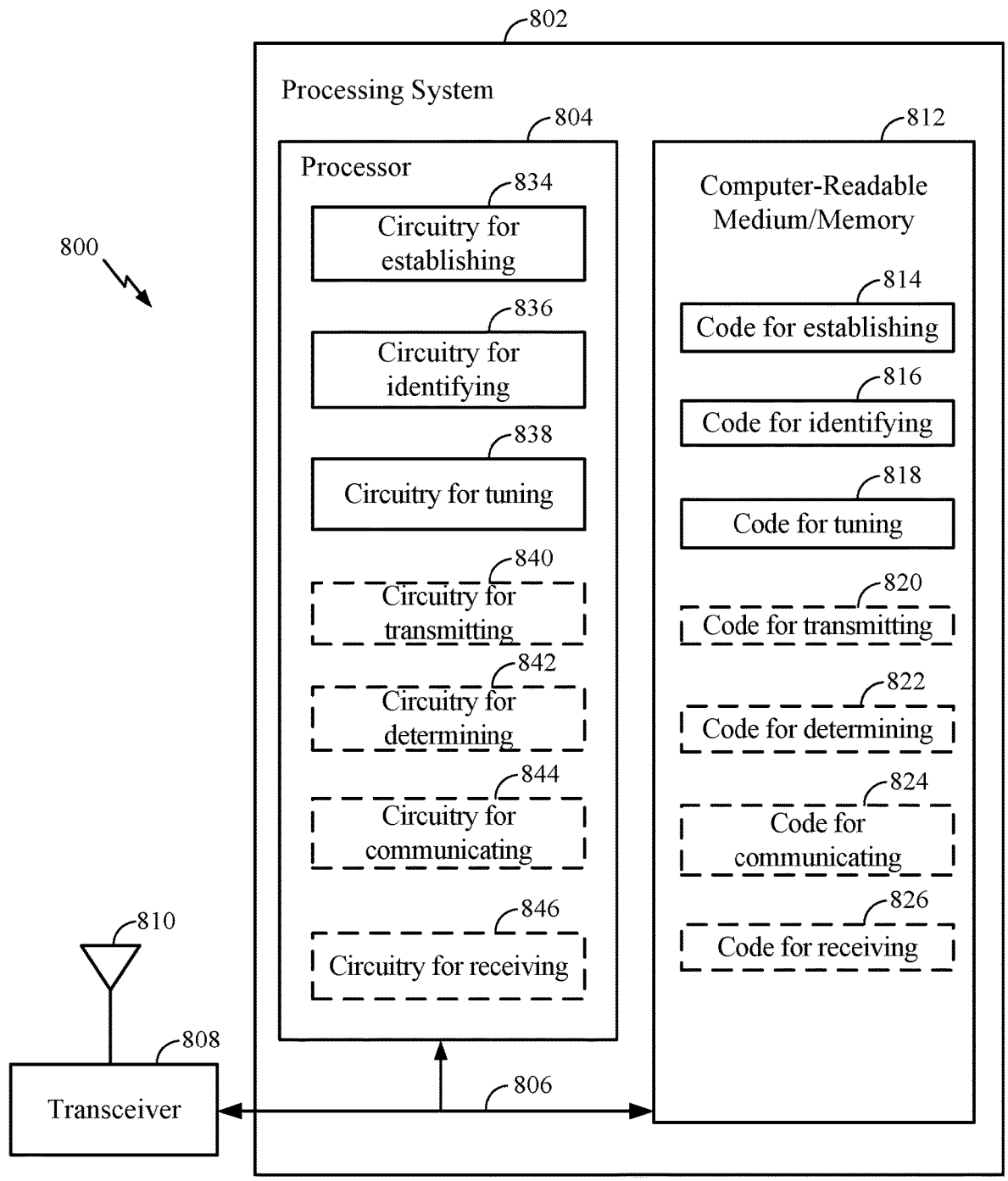
FIG. 8 illustrates a communications device that may include various components configured to perform operations for the techniques disclosed herein in accordance with aspects of the present disclosure

FIG. 8 illustrates a communications device 800 that may include various components (e.g., corresponding to means-plus-function components) configured to perform operations for the techniques disclosed herein, such as the operations illustrated in FIGS. 3, 5, and 6 as well as other operations disclosed herein for multi-USIM and dual connectivity operation. The communications device 800 includes a processing system 802 coupled to a transceiver 808. The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIGS. 3, 5, and 6, or other operations for performing the various techniques discussed herein for multi-USIM and dual connectivity operation. In certain aspects, computer-readable medium/memory 612 stores code for performing the operations illustrated in one or more of FIGS. 3, 5, and 6 as well as other operations disclosed herein for multi-USIM and dual connectivity operation. For example, computer-readable medium/memory 812 stores code for establishing 814, code for identifying 816, code for tuning 818, code for transmitting 820, code for determining 822, code for communicating 824, and code for receiving 826.

In some cases, the code for establishing 814 may include code for establishing a first access link, associated with a first subscriber identification module (SIM) of the UE, for communicating with a first base station.

Additionally, in some cases, the code for establishing 814 may include code for establishing a second access link, associated with the first SIM of the UE, for communicating with a second base station.

Additionally, in some cases, the code for establishing 814 may include code for establishing a third access link associated with a second SIM of the UE.

In some cases, the code for identifying 816 may include code for identifying at least one time division multiplexing (TDM) pattern indicating a set of time periods during which to use the third access link.

In some cases, the code for tuning 818 may include code for tuning to the third access link for communicating using the second SIM during at least one time period of the set of time periods indicated in the TDM pattern.

In some cases, the code for transmitting 820 may include code for transmitting an indication of the at least one TDM pattern to the second base station. In some cases, the code for transmitting 820 may include code for transmitting the indication of the at least one TDM pattern directly to the second base station. In some cases, the code for transmitting 820 may include code for transmitting the indication of the at least one TDM pattern to the second base station via the first base station. In some cases, the code for transmitting 820 may include code for transmitting the indication of the at least one TDM pattern to the first base station using a transparent container.

In some cases, the code for receiving 826 may include code for receiving a confirmation from the second base station confirming the at least one TDM pattern.

In some cases, the code for transmitting 820 may include code for transmitting an index value associated with the at least one TDM pattern.

In some cases, the code for receiving 826 may include code for receiving an indication of the at least one TDM pattern from the second base station.

In some cases, the code for identifying 816 may include code for identifying the at least one TDM pattern is based on the index value.

In some cases, the code for receiving 826 may include code for receiving signaling indicating to start the at least one TDM pattern.

In some cases, the code for transmitting 820 may include code for transmitting, based on one or more criteria, a request to the second base station to stop the at least one TDM pattern.

In some cases, the code for receiving 826 may include code for receiving an indication from the second base station to stop the at least one TDM pattern.

In some cases, the code for transmitting 820 may include code for transmitting, to the second base station, a request to change the at least one TDM pattern.

In some cases, the code for transmitting 820 may include code for transmitting an explicit indication to request the change in the at least one TDM pattern in radio resource control (RRC) signaling.

In some cases, the code for transmitting 820 may include code for transmitting an implicit indication to request the change in the at least one TDM pattern in media access control (MAC) signaling.

In some cases, the code for receiving 826 may include code for receiving paging or system information on the third access link periodically during the set of time periods indicated in the at least one TDM pattern.

In some cases, the code for transmitting 820 may include code for transmitting a tracking area update (TAU) or a radio access network notification area update (RNAU) periodically during the set of time periods indicated in the at least one TDM pattern.

In some cases, the code for transmitting 820 may include code for transmitting at least one of a tracking area update (TAU) or a radio access network notification area update (RNAU) during the set of time periods indicated in the at least one TDM pattern due to a mobility decision.

In some cases, the code for transmitting 820 may include code for transmitting an uplink transmission using the first access link during at least one time period of the set of time periods indicated in the at least one TDM pattern.

In some cases, the code for communicating 824 may include code for communicating with the first base station on the third access link using the second SIM.

In some cases, the code for communicating 824 may include code for communicating with the second base station on the third access link using the second SIM.

In some cases, the code for communicating 824 may include code for communicating with a third base station on the third access link using the second SIM.

In some cases, the code for transmitting 820 may include code for transmitting an indication to the second base station indicating a reduced capability for the second access link.

In some cases, the code for transmitting 820 may include code for transmitting uplink signaling and data on only the first access link during the at least one time period of the set of time periods indicated in the TDM pattern.

In some cases, the code for determining 822 may include code for determining a need for reduced capability on the second access link to communicate on the third access link.

In some cases, the code for transmitting 820 may include code for transmitting an indication of the need for the reduced capability to the second base station.

In some cases, the code for communicating 824 may include code for communicating on the third access link using the second SIM simultaneously with communicating on the second access link using the first SIM.

In some cases, the code for transmitting 820 may include code for transmitting the indication of the need for the reduced capability directly to the second base station.

In some cases, the code for transmitting 820 may include code for transmitting the indication of the need for the reduced capability using a signaling radio bearer established directly between the UE and the second base station.

In some cases, the code for transmitting 820 may include code for transmitting the indication of the need for the reduced capability indirectly to the second base station via the first base station.

In some cases, the code for transmitting 820 may include code for transmitting the indication of the need for the reduced capability to the first base station in a transparent container to be forwarded to the second base station.

In certain aspects, the processor 804 may include circuitry configured to implement the code stored in the computer-readable medium/memory 812, such as for performing the operations illustrated in FIGS. 3, 5, and 6 as well as other operations disclosed herein for multi-USIM and dual connectivity operation. For example, the processor 804 includes circuitry for establishing 834, circuitry for identifying 836, circuitry for tuning 838, circuitry for transmitting 840, circuitry for determining 842, circuitry for communicating 844, and circuitry for receiving 846.

In some cases, the circuitry for establishing 834 may include circuitry for establishing a first access link, associated with a first subscriber identification module (SIM) of the UE, for communicating with a first base station.

Additionally, in some cases, the circuitry for establishing 834 may include circuitry for establishing a second access link, associated with the first SIM of the UE, for communicating with a second base station.

Additionally, in some cases, the circuitry for establishing 834 may include circuitry for establishing a third access link associated with a second SIM of the UE.

In some cases, the circuitry for identifying 836 may include circuitry for identifying at least one time division multiplexing (TDM) pattern indicating a set of time periods during which to use the third access link.

In some cases, the circuitry for tuning 838 may include circuitry for tuning to the third access link for communicating using the second SIM during at least one time period of the set of time periods indicated in the TDM pattern.

In some cases, the circuitry for transmitting 840 may include circuitry for transmitting an indication of the at least one TDM pattern to the second base station. In some cases, the circuitry for transmitting 840 may include circuitry for transmitting the indication of the at least one TDM pattern directly to the second base station. In some cases, the circuitry for transmitting 840 may include circuitry for transmitting the indication of the at least one TDM pattern to the second base station via the first base station. In some cases, the circuitry for transmitting 840 may include circuitry for transmitting the indication of the at least one TDM pattern to the first base station using a transparent container.

In some cases, the circuitry for receiving 846 may include circuitry for receiving a confirmation from the second base station confirming the at least one TDM pattern.

In some cases, the circuitry for transmitting 840 may include circuitry for transmitting an index value associated with the at least one TDM pattern.

In some cases, the circuitry for receiving 846 may include circuitry for receiving an indication of the at least one TDM pattern from the second base station.

In some cases, the circuitry for identifying 836 may include circuitry for identifying the at least one TDM pattern is based on the index value.

In some cases, the circuitry for receiving 846 may include circuitry for receiving signaling indicating to start the at least one TDM pattern.

In some cases, the circuitry for transmitting 840 may include circuitry for transmitting, based on one or more criteria, a request to the second base station to stop the at least one TDM pattern.

In some cases, the circuitry for receiving 846 may include circuitry for receiving an indication from the second base station to stop the at least one TDM pattern.

In some cases, the circuitry for transmitting 840 may include circuitry for transmitting, to the second base station, a request to change the at least one TDM pattern.

In some cases, the circuitry for transmitting 840 may include circuitry for transmitting an explicit indication to request the change in the at least one TDM pattern in radio resource control (RRC) signaling.

In some cases, the circuitry for transmitting 840 may include circuitry for transmitting an implicit indication to request the change in the at least one TDM pattern in media access control (MAC) signaling.

In some cases, the circuitry for receiving 846 may include circuitry for receiving paging or system information on the third access link periodically during the set of time periods indicated in the at least one TDM pattern.

In some cases, the circuitry for transmitting 840 may include circuitry for transmitting a tracking area update (TAU) or a radio access network notification area update (RNAU) periodically during the set of time periods indicated in the at least one TDM pattern.

In some cases, the circuitry for transmitting 840 may include circuitry for transmitting at least one of a tracking area update (TAU) or a radio access network notification area update (RNAU) during the set of time periods indicated in the at least one TDM pattern due to a mobility decision.

In some cases, the circuitry for transmitting 840 may include circuitry for transmitting an uplink transmission using the first access link during at least one time period of the set of time periods indicated in the at least one TDM pattern.

In some cases, the circuitry for communicating 844 may include circuitry for communicating with the first base station on the third access link using the second SIM.

In some cases, the circuitry for communicating 844 may include circuitry for communicating with the second base station on the third access link using the second SIM.

In some cases, the circuitry for communicating 844 may include circuitry for communicating with a third base station on the third access link using the second SIM.

In some cases, the circuitry for transmitting 840 may include circuitry for transmitting an indication to the second base station indicating a reduced capability for the second access link.

In some cases, the circuitry for transmitting 840 may include circuitry for transmitting uplink signaling and data on only the first access link during the at least one time period of the set of time periods indicated in the TDM pattern.

In some cases, the circuitry for determining 842 may include circuitry for determining a need for reduced capability on the second access link to communicate on the third access link.

In some cases, the circuitry for transmitting 840 may include circuitry for transmitting an indication of the need for the reduced capability to the second base station.

In some cases, the circuitry for communicating 844 may include circuitry for communicating on the third access link using the second SIM simultaneously with communicating on the second access link using the first SIM.

In some cases, the circuitry for transmitting 840 may include circuitry for transmitting the indication of the need for the reduced capability directly to the second base station.

In some cases, the circuitry for transmitting 840 may include circuitry for transmitting the indication of the need for the reduced capability using a signaling radio bearer established directly between the UE and the second base station.

In some cases, the circuitry for transmitting 840 may include circuitry for transmitting the indication of the need for the reduced capability indirectly to the second base station via the first base station.

In some cases, the circuitry for transmitting 840 may include circuitry for transmitting the indication of the need for the reduced capability to the first base station in a transparent container to be forwarded to the second base station.

Figure 9:
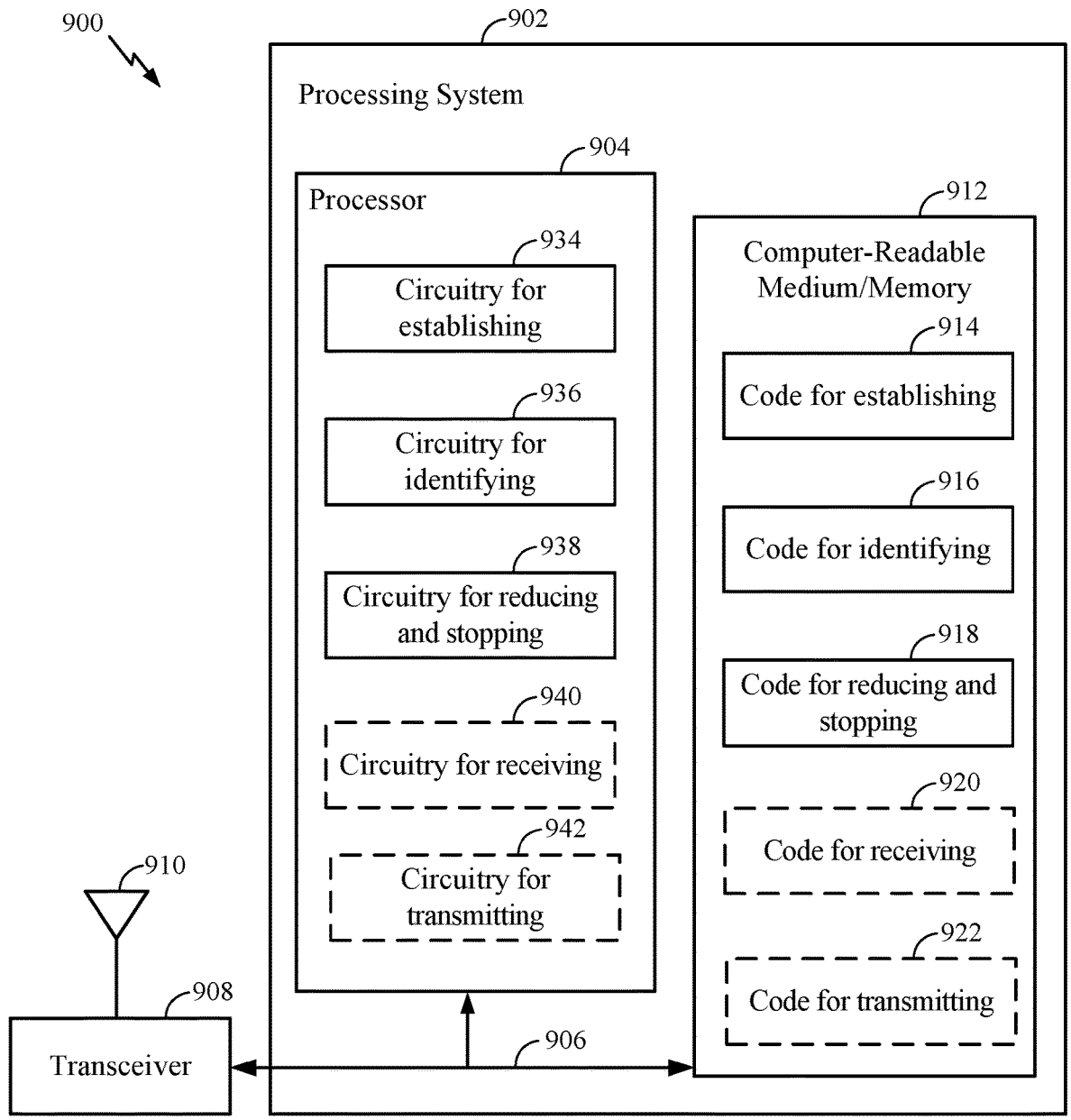
FIG. 9 illustrates a communications device that may include various components configured to perform operations for the techniques disclosed herein in accordance with aspects of the present disclosure.

FIG. 9 illustrates a communications device 900 that may include various components (e.g., corresponding to meansplus-function components) configured to perform operations for the techniques disclosed herein, such as the operations illustrated in FIGS. 4, 5, and 7 as well as other operations disclosed herein for multi-USIM and dual connectivity operation. The communications device 900 includes a processing system 902 coupled to a transceiver 908. The transceiver 908 is configured to transmit and receive signals for the communications device 900 via an antenna 910, such as the various signals as described herein. The processing system 902 may be configured to perform processing functions for the communications device 900, including processing signals received and/or to be transmitted by the communications device 900.

The processing system 902 includes a processor 904 coupled to a computer-readable medium/memory 912 via a bus 906. In certain aspects, the computer-readable medium/memory 912 is configured to store instructions (e.g., computer-executable code) that when executed by the processor 904, cause the processor 904 to perform the operations illustrated in FIGS. 4, 5, and 7, or other operations for performing the various techniques discussed herein for multi-USIM and dual connectivity operation. In certain aspects, computer-readable medium/memory 912 stores code for performing the operations illustrated in one or more of FIGS. 4, 5, and 7 as well as other operations disclosed herein for multi-USIM and dual connectivity operation. For example, computer-readable medium/memory 912 stores code for establishing 914, code for identifying 916, code for reducing or stopping 918, code for receiving 920, and code for transmitting 922.

In some cases, the code for establishing 914 may include code for establishing a first access link for communicating with a user equipment.

In some cases, the code for identifying 916 may include code for identifying at least one time division multiplexing (TDM) pattern indicating a set of time periods for the UE to use to tune to a second access link for communicating with a second base station.

In some cases, the code for reducing or stopping 918 may include code for reducing or stopping transmissions to the UE on the first access link during at least one time period of the set of time periods.

In some cases, the code for receiving 920 may include code for receiving an indication of the at least one TDM pattern to the second base station, wherein identifying the at least one TDM pattern is based on the received indication of the at least one TDM pattern.

In some cases, the code for receiving 920 may include code for receiving the indication of the at least one TDM pattern indirectly from the UE via a third base station.

In some cases, the code for receiving 920 may include code for receiving the indication of the TDM pattern from the third base station in a transparent container.

In some cases, the code for transmitting 922 may include code for transmitting a confirmation to the UE confirming the at least one TDM pattern.

In some cases, the code for receiving 920 may include code for receiving the indication of the at least one TDM pattern from the UE comprises receiving an index value associated with the at least one TDM pattern.

In some cases, the code for identifying 916 may include code for identifying the at least one TDM pattern is based on the index value.

In some cases, the code for transmitting 922 may include code for transmitting an indication of the at least one TDM pattern to the UE.

In some cases, the code for transmitting 922 may include code for transmitting an index value associated with the at least one TDM pattern.

In some cases, the code for transmitting 922 may include code for transmitting signaling indicating to start the at least one TDM pattern, wherein the signaling comprise at least one of media access control (MAC) layer signaling or physical (PHY) layer signaling.

In some cases, the code for receiving 920 may include code for receiving, based on one or more criteria, a request to the second base station to stop the at least one TDM pattern.

In some cases, the code for transmitting 922 may include code for transmitting an indication to stop the at least one TDM pattern to the UE.

In some cases, the code for receiving 920 may include code for receiving, from the UE, a request to change the at least one TDM pattern.

In some cases, the code for receiving 920 may include code for receiving an explicit indication to request the change in the at least one TDM pattern in radio resource control (RRC) signaling.

In some cases, the code for receiving 920 may include code for receiving an implicit indication to request the change in the at least one TDM pattern in media access control (MAC) signaling.

In some cases, the code for receiving 920 may include code for receiving an indication from the UE indicating a reduced capability for the first access link.

In some cases, the code for receiving 920 may include code for receiving, from the UE, an indication of a need for reduced capability on the first access link.

In some cases, the code for reducing or stopping 918 may include code for reducing a number of transmissions to the UE on the first access link in response to the indication of the need for the reduced capability.

In some cases, the code for receiving 920 may include code for receiving the indication of the need for the reduced capability directly from the UE.

In some cases, the code for receiving 920 may include code for receiving the indication using a signaling radio bearer established directly between the UE and the first base station.

In some cases, the code for receiving 920 may include code for receiving the indication indirectly from the UE via a second base station.

In certain aspects, the processor 904 may include circuitry configured to implement the code stored in the computer-readable medium/memory 912, such as for performing the operations illustrated in FIGS. 4, 5, and 7 as well as other operations disclosed herein for multi-USIM and dual connectivity operation. For example, the processor 904 includes circuitry for establishing 934, circuitry for identifying 916, circuitry for reducing or stopping 918, circuitry for receiving 920, and circuitry for transmitting 922.

In some cases, the circuitry for establishing 934 may include circuitry for establishing a first access link for communicating with a user equipment.

In some cases, the circuitry for identifying 936 may include circuitry for identifying at least one time division multiplexing (TDM) pattern indicating a set of time periods for the UE to use to tune to a second access link for communicating with a second base station.

In some cases, the circuitry for reducing or stopping 938 may include circuitry for reducing or stopping transmissions to the UE on the first access link during at least one time period of the set of time periods.

In some cases, the circuitry for receiving 940 may include circuitry for receiving an indication of the at least one TDM pattern to the second base station, wherein identifying the at least one TDM pattern is based on the received indication of the at least one TDM pattern.

In some cases, the circuitry for receiving 940 may include circuitry for receiving the indication of the at least one TDM pattern indirectly from the UE via a third base station.

In some cases, the circuitry for receiving 940 may include circuitry for receiving the indication of the TDM pattern from the third base station in a transparent container.

In some cases, the circuitry for transmitting 942 may include circuitry for transmitting a confirmation to the UE confirming the at least one TDM pattern.

In some cases, the circuitry for receiving 940 may include circuitry for receiving the indication of the at least one TDM pattern from the UE comprises receiving an index value associated with the at least one TDM pattern.

In some cases, the circuitry for identifying 936 may include circuitry for identifying the at least one TDM pattern is based on the index value.

In some cases, the circuitry for transmitting 942 may include circuitry for transmitting an indication of the at least one TDM pattern to the UE.

In some cases, the circuitry for transmitting 942 may include circuitry for transmitting an index value associated with the at least one TDM pattern.

In some cases, the circuitry for transmitting 942 may include circuitry for transmitting signaling indicating to start the at least one TDM pattern, wherein the signaling comprise at least one of media access control (MAC) layer signaling or physical (PHY) layer signaling.

In some cases, the circuitry for receiving 940 may include circuitry for receiving, based on one or more criteria, a request to the second base station to stop the at least one TDM pattern.

In some cases, the circuitry for transmitting 942 may include circuitry for transmitting an indication to stop the at least one TDM pattern to the UE.

In some cases, the circuitry for receiving 940 may include circuitry for receiving, from the UE, a request to change the at least one TDM pattern.

In some cases, the circuitry for receiving 940 may include circuitry for receiving an explicit indication to request the change in the at least one TDM pattern in radio resource control (RRC) signaling.

In some cases, the circuitry for receiving 940 may include circuitry for receiving an implicit indication to request the change in the at least one TDM pattern in media access control (MAC) signaling.

In some cases, the circuitry for receiving 940 may include circuitry for receiving an indication from the UE indicating a reduced capability for the first access link.

In some cases, the circuitry for receiving 940 may include circuitry for receiving, from the UE, an indication of a need for reduced capability on the first access link.

In some cases, the circuitry for reducing or stopping 938 may include circuitry for reducing a number of transmissions to the UE on the first access link in response to the indication of the need for the reduced capability.

In some cases, the circuitry for receiving 940 may include circuitry for receiving the indication of the need for the reduced capability directly from the UE.

In some cases, the circuitry for receiving 940 may include circuitry for receiving the indication using a signaling radio bearer established directly between the UE and the first base station.

In some cases, the circuitry for receiving 940 may include circuitry for receiving the indication indirectly from the UE via a second base station.

EXAMPLE ASPECTS

Aspect 1: A method performed by a user equipment (UE) for wireless communication, comprising: establishing a first access link, associated with a first subscriber identification module (SIM) of the UE, for communicating with a first base station; establishing a second access link, associated with the first SIM of the UE, for communicating with a second base station; establishing a third access link associated with a second SIM of the UE; identifying at least one time division multiplexing (TDM) pattern indicating a set of time periods during which to use the third access link; and tuning to the third access link for communicating using the second SIM during at least one time period of the set of time periods indicated in the TDM pattern.

Aspect 2: The method of Aspect 1, further comprising transmitting an indication of the at least one TDM pattern to the second base station.

Aspect 3: The method of Aspect 2, wherein transmitting the indication of the TDM pattern to the second base station comprises transmitting the indication of the at least one TDM pattern directly to the second base station.

Aspect 4: The method of Aspect 2, wherein transmitting the indication of the TDM pattern to the second base station comprises transmitting the indication of the at least one TDM pattern to the second base station via the first base station.

Aspect 5: The method of Aspect 4, wherein transmitting the indication of the at least one TDM pattern to the second base station via the first base station comprises transmitting the indication of the at least one TDM pattern to the first base station using a transparent container.

Aspect 6: The method of any of Aspects 1-5, further comprising receiving a confirmation from the second base station confirming the at least one TDM pattern.

Aspect 7: The method of claim 6, wherein the confirmation is received directly from the second base station or from the first base station in a transparent container.

Aspect 8: The method of any of Aspects 2-7, wherein transmitting the indication of the at least one TDM pattern to the second base station comprises transmitting an index value associated with the at least one TDM pattern.

Aspect 9: The method of any of Aspects 1-8, wherein identifying the at least one TDM pattern comprises receiving an indication of the at least one TDM pattern from the second base station.

Aspect 10: The method of Aspect 9, wherein the indication of the at least one TDM pattern comprises an index value associated with the at least one TDM pattern and identifying the at least one TDM pattern is based on the index value.

Aspect 11: The method of any of Aspects 9-10, wherein the indication of the at least one TDM pattern is received from the second base station via the first base station in a transparent container.

Aspect 12: The method of any of Aspects 9-11, wherein the indication of the at least one TDM pattern is received in radio resource control (RRC) signaling.

Aspect 13: The method of Aspect 12, wherein the at least one TDM pattern starts immediately after the UE processes the RRC signaling.

Aspect 14: The method of any of Aspects 12-13, further comprising receiving signaling indicating to start the at least one TDM pattern, wherein the signaling comprise at least one of media access control (MAC) layer signaling or physical (PHY) layer signaling.

Aspect 15: The method of Aspect 14, wherein the MAC signaling comprises a MAC control element (MAC-CE) and the PHY layer signaling comprises downlink control information (DCI).

Aspect 16: The method of any of Aspects 14-15, wherein the MAC layer signaling or the PHY layer signaling comprises an index value associated with the at least one TDM pattern.

Aspect 17: The method of any of Aspects 14-16, wherein the at least one TDM pattern starts immediately after receiving the signaling indicating to start the at least one TDM pattern.

Aspect 18: The method of any of Aspects 1-17, further comprising transmitting, based on one or more criteria, a request to the second base station to stop the at least one TDM pattern.

Aspect 19: The method of Aspect 18, wherein the one or more criteria comprises the commencement of a voice call.

Aspect 20: The method of any of Aspects 1-19, further comprising receiving an indication from the second base station to stop the at least one TDM pattern.

Aspect 21: The method of Aspect 20, wherein the indication to stop the at least one TDM pattern is received in at least one of in media access control (MAC) layer signaling or physical (PHY) layer signaling and the indication to stop the at least one TDM pattern comprises an index value associated with the at least one TDM pattern.

Aspect 22: The method of any of Aspects 1-21, further comprising transmitting, to the second base station, a request to change the at least one TDM pattern.

Aspect 23: The method of Aspect 22, wherein transmitting the request to change the at least one TDM pattern comprises at least one of: transmitting an explicit indication to request the change in the at least one TDM pattern in radio resource control (RRC) signaling or transmitting an implicit indication to request the change in the at least one TDM pattern in media access control (MAC) signaling, wherein the implicit indication comprises an index value associated with the at least one TDM pattern.

Aspect 24: The method of any of Aspects 1-23, wherein the at least one TDM pattern applies to downlink transmissions only or uplink transmissions only.

Aspect 25: The method of any of Aspects 1-24, wherein the at least one TDM pattern is periodic.

Aspect 26: The method of Aspect 25, further comprising at least one of: receiving paging or system information on the third access link periodically during the set of time periods indicated in the at least one TDM pattern or transmitting a tracking area update (TAU) or a radio access network notification area update (RNAU) periodically during the set of time periods indicated in the at least one TDM pattern.

Aspect 27: The method of any of Aspects 1-24, wherein the at least one TDM pattern is aperiodic.

Aspect 28: The method of Aspect 27, further comprising transmitting at least one of a tracking area update (TAU) or a radio access network notification area update (RNAU) during the set of time periods indicated in the at least one TDM pattern due to a mobility decision.

Aspect 29: The method of any of Aspects 1-28, further comprising transmitting an uplink transmission using the first access link during at least one time period of the set of time periods indicated in the at least one TDM pattern.

Aspect 30: The method of any of Aspects 1-29, wherein the at least one TDM pattern is semi-statically configured.

Aspect 31: The method of any of Aspects 1-30, wherein the first base station comprises a master node and the second base station comprises a secondary node.

Aspect 32: The method of any of Aspects 1-31, wherein the first base station comprises a long term evolution (LTE) base station and the second base station comprises a 5G base station.

Aspect 33: The method of any of Aspects 1-32, wherein tuning to the third access link for communicating using the second SIM during at least one time period of the set of time periods indicated in the at least one TDM pattern comprises one of: communicating with the first base station on the third access link using the second SIM, communicating with the second base station on the third access link using the second SIM, or communicating with a third base station on the third access link using the second SIM, wherein the third base station is different from the first base station and the second base station.

Aspect 34: The method of any of Aspects 1-33, wherein identifying the at least one TDM pattern comprises transmitting an indication to the second base station indicating a reduced capability for the second access link, wherein the second access link operates according to the reduced capability during at least one time period of the set of time periods indicated in the TDM pattern.

Aspect 35: The method of any of Aspects 1-34, further comprising transmitting uplink signaling and data on only the first access link during the at least one time period of the set of time periods indicated in the TDM pattern.

Aspect 36: A method performed by a first base station (BS) for wireless communication, comprising: establishing a first access link for communicating with a user equipment, identifying at least one time division multiplexing (TDM) pattern indicating a set of time periods for the UE to use to tune to a second access link for communicating with a second base station, and one of reducing or stopping transmissions to the UE on the first access link during at least one time period of the set of time periods.

Aspect 37: The method of Aspect 36, further comprising receiving an indication of the at least one TDM pattern to the second base station, wherein identifying the at least one TDM pattern is based on the received indication of the at least one TDM pattern.

Aspect 38: The method of Aspect 37, wherein the indication of the TDM pattern to the second base station is received directly to from the UE.

Aspect 39: The method of any of Aspects 37-38, wherein receiving the indication of the TDM pattern from the UE comprises receiving the indication of the at least one TDM pattern indirectly from the UE via a third base station.

Aspect 40: The method of Aspect 39, wherein receiving the indication of the TDM pattern indirectly from the UE via the third base station comprises receiving the indication of the TDM pattern from the third base station in a transparent container.

Aspect 41: The method of any of Aspects 37-40, further comprising transmitting a confirmation to the UE confirming the at least one TDM pattern.

Aspect 42: The method of Aspect 41, wherein the confirmation is transmitted directly to the UE or to the third base station in a transparent container.

Aspect 43. The method of any of Aspects 37-42, wherein receiving the indication of the at least one TDM pattern from the UE comprises receiving an index value associated with the at least one TDM pattern and identifying the at least one TDM pattern is based on the index value.

Aspect 44: The method of any of Aspects 36-43, wherein a third access link is established between the third base station and the UE.

Aspect 45: The method of any of Aspects 36-44, wherein the third base station comprises a master node and the first base station comprises a secondary node.

Aspect 46: The method of any of Aspects 36-45, wherein the third base station comprises a long term evolution (LTE) base station and the first base station comprises a 5G base station.

Aspect 47: The method of any of Aspects 36-46, further comprising transmitting an indication of the at least one TDM pattern to the UE.

Aspect 48: The method of Aspect 47, wherein transmitting the indication of the at least one TDM pattern to the UE comprises transmitting an index value associated with the at least one TDM pattern.

Aspect 49: The method of any of Aspects 47-48, wherein the indication of the at least one TDM pattern is transmitted to the UE indirectly via a third base station in a transparent container.

Aspect 50: The method of any of Aspects 47-49, wherein the indication of the at least one TDM pattern is transmitted in radio resource control (RRC) signaling.

Aspect 51: The method of Aspect 50, further comprising transmitting signaling indicating to start the at least one TDM pattern, wherein the signaling comprise at least one of media access control (MAC) layer signaling or physical (PHY) layer signaling.

Aspect 52: The method of Aspect 51, wherein the MAC signaling comprises a MAC control element (MAC-CE) and the PHY layer signaling comprises downlink control information (DCI).

Aspect 53: The method of any of Aspects 51-52, wherein the MAC layer signaling or the PHY layer signaling comprises an index value associated with the at least one TDM pattern.

Aspect 54: The method of any of Aspects 36-53, further comprising receiving, based on one or more criteria, a request to the second base station to stop the at least one TDM pattern.

Aspect 55: The method of Aspect 54, wherein the one or more criteria comprises the commencement of a voice call at the UE.

Aspect 56: The method of any of Aspects 36-55, further comprising transmitting an indication to stop the at least one TDM pattern to the UE.

Aspect 57: The method of Aspect 56, wherein the indication to stop the at least one TDM pattern is transmitted in at least one of in media access control (MAC) layer signaling or physical (PHY) layer signaling and the indication to stop the at least one TDM pattern comprises an index value associated with the at least one TDM pattern.

Aspect 58: The method of and of Aspects 36-57, further comprising receiving, from the UE, a request to change the at least one TDM pattern.

Aspect 59: The method of Aspect 58, wherein receiving the request to change the at least one TDM pattern comprises at least one of: receiving an explicit indication to request the change in the at least one TDM pattern in radio resource control (RRC) signaling or receiving an implicit indication to request the change in the at least one TDM pattern in media access control (MAC) signaling, wherein the implicit indication comprises an index value associated with the at least one TDM pattern.

Aspect 60: The method of any of Aspects 36-59, wherein the at least one TDM pattern applies to downlink transmissions only or uplink transmissions only.

Aspect 61: The method of any of Aspect 36-60, wherein the at least one TDM pattern is periodic.

Aspect 62: The method of any of Aspects 36-60, wherein the at least one TDM pattern is aperiodic.

Aspect 63: The method of any of Aspects 36-62, wherein the at least one TDM pattern is semi-statically configured.

Aspect 64: The method of any of Aspects 36-63, wherein identifying the at least one TDM pattern comprises receiving an indication from the UE indicating a reduced capability for the first access link.

Aspect 65: A method performed by a user equipment (UE) for wireless communication, comprising: establishing a first access link, associated with a first subscriber identification module (SIM) of the UE, for communicating with a first base station, establishing a second access link, associated with the first SIM of the UE, for communicating with a second base station, establishing a third access link associated with a second SIM of the UE, determining a need for reduced capability on the second access link to communicate on the third access link, transmitting an indication of the need for the reduced capability to the second base station, and communicating on the third access link using the second SIM simultaneously with communicating on the second access link using the first SIM, wherein communicating on the second access link is at the reduced capability.

Aspect 66: The method of Aspect 65, wherein transmitting the indication of the need for the reduced capability to the second base station comprises transmitting the indication directly to the second base station.

Aspect 67: The method of Aspect 66, wherein transmitting the indication directly to the second base station comprises transmitting the indication using a signaling radio bearer established directly between the UE and the second base station.

Aspect 68: The method of Aspect 65, wherein transmitting the indication of the need for the reduced capability to the second base station comprises transmitting the indication indirectly to the second base station via the first base station.

Aspect 69: The method of Aspect 68, wherein transmitting the indication indirectly to the second base station via the first base station comprises transmitting the indication to the first base station in a transparent container to be forwarded to the second base station.

Aspect 70: The method of any of Aspects 65-69, wherein determining the need for the reduced capability on the second access link is based on a capability of the UE to support communication on the second access link and the third access link simultaneously.

Aspect 71: The method of any of Aspects 65-69, wherein the indication of the need for the reduced capability indicates to the second base station to reduce an amount of transmissions by the second base station to the UE on the second access link.

Aspect 72: The method of any of Aspects 65-71, wherein the first base station comprises a master node (MN) and the second base station comprises a secondary node (SN).

Aspect 73: A method performed by a first base station (BS) for wireless communication, comprising: establishing a first access link for communicating with a user equipment (UE), receiving, from the UE, an indication of a need for reduced capability on the first access link, and reducing a number of transmissions to the UE on the first access link in response to the indication of the need for the reduced capability.

Aspect 74: The method of Aspect 73, wherein receiving the indication of the need for the reduced capability from the UE comprises receiving the indication directly from the UE.

Aspect 75: The method of Aspect 74, wherein receiving the indication directly from the UE comprises receiving the indication using a signaling radio bearer established directly between the UE and the first base station.

Aspect 76: The method of Aspect 73, wherein receiving the indication of the need for the reduced capability from the UE comprises receiving the indication indirectly from the UE via a second base station.

Aspect 77: The method of Aspect 76, wherein the indication is received from the second base station in a transparent container.

Aspect 78: The method of any of Aspects 73-77, wherein the second base station comprises a master node (MN) and the first base station comprises a secondary node (SN).

ADDITIONAL CONSIDERATIONS

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, and/or 5G wireless technologies, aspects of the present disclosure can be applied in other generation-based communication systems.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (e.g., 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In some examples, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer.

In the case of a user equipment 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 3-7 and other operations for performing the various techniques discussed herein for multi-universal subscriber identification module (USIM) and dual connectivity operation.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. A method performed by a user equipment (UE) for wireless communication, comprising:
    establishing a first access link, associated with a first subscriber identification module (SIM) of the UE, for communicating with a first base station;
    establishing a second access link, associated with the first SIM of the UE, for communicating with a second base station;
    establishing a third access link associated with a second SIM of the UE;
    identifying at least one time division multiplexing (TDM) pattern indicating a set of time periods during which to use the third access link; and tuning to the third access link for communicating using the second SIM during at least one time period of the set of time periods indicated in the TDM pattern.

2. The method of claim 1, further comprising transmitting an indication of the at least one TDM pattern to the second base station, wherein transmitting the indication of the TDM pattern to the second base station comprises at least one of:
transmitting the indication of the at least one TDM pattern directly to the second base station; or
transmitting the indication of the at least one TDM pattern to the second base station via the first base station using a transparent container.

3. The method of claim 2, further comprising receiving a confirmation from the second base station confirming the at least one TDM pattern, wherein the confirmation is received:
directly from the second base station; or
from the first base station in a transparent container.

4. The method of claim 1, wherein:
identifying the at least one TDM pattern comprises receiving an indication of the at least one TDM pattern from the second base station, wherein the indication is received directly from the second base station or indirectly from the second base station via the first base station in a transparent container;
the indication of the at least one TDM pattern comprises an index value associated with the at least one TDM pattern; and
identifying the at least one TDM pattern is based on the index value.

5. The method of claim 4, wherein:
the indication of the at least one TDM pattern is received in radio resource control (RRC) signaling; and
the at least one TDM pattern starts immediately after the UE processes the RRC signaling.

6. The method of claim 4, further comprising receiving signaling indicating to start the at least one TDM pattern, wherein:
the signaling comprises at least one of media access control (MAC) layer signaling or physical (PHY) layer signaling;
the MAC signaling comprises a MAC control element (MAC-CE) and the PHY layer signaling comprises downlink control information (DCI);
the MAC layer signaling or the PHY layer signaling comprises the index value associated with the at least one TDM pattern; and
the at least one TDM pattern starts immediately after receiving the signaling indicating to start the at least one TDM pattern.

7. The method of claim 1, further comprising transmitting, based on one or more criteria, a request to the second base station to stop the at least one TDM pattern, wherein the one or more criteria comprises commencement of a voice call.

8. The method of claim 1, further comprising receiving an indication from the second base station to stop the at least one TDM pattern, wherein:
the indication to stop the at least one TDM pattern is received in at least one of in media access control (MAC) layer signaling or physical (PHY) layer signaling; and
the indication to stop the at least one TDM pattern comprises an index value associated with the at least one TDM pattern.

9. The method of claim 1, further comprising transmitting, to the second base station, a request to change the at least one TDM pattern, wherein transmitting the request to change the at least one TDM pattern comprises at least one of:
transmitting an explicit indication to request the change in the at least one TDM pattern in radio resource control (RRC) signaling; or
transmitting an implicit indication to request the change in the at least one TDM pattern in media access control (MAC) signaling, wherein the implicit indication comprises an index value associated with the at least one TDM pattern.

10. The method of claim 1, wherein the at least one TDM pattern applies to downlink transmissions only or uplink transmissions only.

11. The method of claim 1, wherein the at least one TDM pattern is periodic and further comprising at least one of:
receiving paging or system information on the third access link periodically during the set of time periods indicated in the at least one TDM pattern; or
transmitting a tracking area update (TAU) or a radio access network notification area update (RNAU) periodically during the set of time periods indicated in the at least one TDM pattern.

12. The method of claim 1, wherein the at least one TDM pattern is aperiodic or semi-statically configured and, when the at least one TDM pattern is aperiodic, the method further comprises transmitting at least one of a tracking area update (TAU) or a radio access network notification area update (RNAU) during the set of time periods indicated in the at least one TDM pattern due to a mobility decision.

13. The method of claim 1, further comprising transmitting an uplink transmission using the first access link during at least one time period of the set of time periods indicated in the at least one TDM pattern.

14. The method of claim 1, wherein:
the first base station comprises a master node;
the second base station comprises a secondary node;
the first base station comprises a long term evolution (LTE) base station; and
the second base station comprises a 5G base station.

15. The method of claim 1, wherein tuning to the third access link for communicating using the second SIM during at least one time period of the set of time periods indicated in the at least one TDM pattern comprises one of:
communicating with the first base station on the third access link using the second SIM;
communicating with the second base station on the third access link using the second SIM; or
communicating with a third base station on the third access link using the second SIM, wherein the third base station is different from the first base station and the second base station.

16. The method of claim 1, wherein identifying the at least one TDM pattern comprises transmitting an indication to the second base station indicating a reduced capability for the second access link, wherein the second access link operates according to the reduced capability during at least one time period of the set of time periods indicated in the TDM pattern.

17. A method performed by a first base station (BS) for wireless communication, comprising:
establishing a first access link for communicating with a user equipment (UE);
identifying at least one time division multiplexing (TDM) pattern indicating a set of time periods for the UE to use to tune to a second access link for communicating with a second base station;

transmitting signaling to start the at least one TDM pattern, wherein the signaling comprises:
  a MAC control element (MAC-CE) or downlink control information (DCI); and
  an index value associated with the at least one TDM pattern; and
one of reducing or stopping transmissions to the UE on the first access link during at least one time period of the set of time periods.

18. The method of claim 17, further comprising receiving an indication of the at least one TDM pattern from the UE, wherein identifying the at least one TDM pattern is based on the received indication of the at least one TDM pattern, and wherein at least one of:
  the indication of the TDM pattern to the second base station is received directly to from the UE; or
  the indication of the at least one TDM pattern is received indirectly from the UE via a third base station in a transparent container.

19. The method of claim 18, further comprising transmitting a confirmation to the UE confirming the at least one TDM pattern, wherein the confirmation is transmitted:
  directly to the UE; or
  to the third base station in a transparent container.

20. The method of claim 18, wherein:
  a third access link is established between the third base station and the UE;
  the third base station comprises a master node;
  the first base station comprises a secondary node;
  the third base station comprises a long term evolution (LTE) base station; and
  the first base station comprises a 5G base station.

21. The method of claim 17, further comprising:
  transmitting an indication of the at least one TDM pattern to the UE, the indication comprising the index value associated with the at least one TDM pattern, wherein at least one of:
    the indication of the at least one TDM pattern is transmitted to the UE indirectly via a third base station in a transparent container; or
    the indication of the at least one TDM pattern is transmitted in radio resource control (RRC) signaling.

22. The method of claim 17, further comprising receiving, based on one or more criteria, a request to the second base station to stop the at least one TDM pattern, wherein the one or more criteria comprises commencement of a voice call at the UE.

23. The method of claim 17, further comprising transmitting an indication to stop the at least one TDM pattern to the UE, wherein:
  the indication to stop the at least one TDM pattern is transmitted in at least one of media access control (MAC) layer signaling or physical (PHY) layer signaling; and
  the indication to stop the at least one TDM pattern comprises the index value associated with the at least one TDM pattern.

24. The method of claim 17, further comprising receiving, from the UE, a request to change the at least one TDM pattern, wherein receiving the request to change the at least one TDM pattern comprises at least one of:
  receiving an explicit indication to request the change in the at least one TDM pattern in radio resource control (RRC) signaling; or
  receiving an implicit indication to request the change in the at least one TDM pattern in media access control (MAC) signaling, wherein the implicit indication comprises the index value associated with the at least one TDM pattern.

25. The method of claim 17, wherein the at least one TDM pattern applies to downlink transmissions only or uplink transmissions only.

26. The method of claim 17, wherein:
  the at least one TDM pattern is periodic;
  the at least one TDM pattern is aperiodic; or
  the at least one TDM pattern is semi-statically configured.

27. The method of claim 17, wherein identifying the at least one TDM pattern comprises receiving an indication from the UE indicating a reduced capability for the first access link.

28. An apparatus for wireless communication by a user equipment (UE), comprising:
  at least one processor configured to:
    establish a first access link, associated with a first subscriber identification module (SIM) of the UE, for communicating with a first base station;
    establish a second access link, associated with the first SIM of the UE, for communicating with a second base station;
    establish a third access link associated with a second SIM of the UE;
    identify at least one time division multiplexing (TDM) pattern indicating a set of time periods during which to use the third access link; and
    tune to the third access link for communicating using the second SIM during at least one time period of the set of time periods indicated in the TDM pattern; and
  a memory coupled with the at least one processor.

29. An apparatus for wireless communication by a base station (BS), comprising:
  at least one processor configured to:
    establish a first access link for communicating with a user equipment;
    identify at least one time division multiplexing (TDM) pattern indicating a set of time periods for the UE to use to tune to a second access link for communicating with a second base station; and
    transmit signaling indicating to start the at least one TDM pattern, wherein the signaling comprises:
      a MAC control element (MAC-CE) or downlink control information (DCI); and
      an index value associated with the at least one TDM pattern; and
    one of reduce or stop transmissions to the UE on the first access link during at least one time period of the set of time periods; and
  a memory coupled with the at least one processor.

* * * * *